United States Patent
Dietz et al.

(10) Patent No.: US 9,607,329 B2
(45) Date of Patent: Mar. 28, 2017

(54) DIGITAL CONFERENCING SERVICES MARKETPLACE

(71) Applicant: Microsoft Technology Licensing, LLC, Redmond, WA (US)

(72) Inventors: Paul H. Dietz, Redmond, WA (US); Steve Bathiche, Kirkland, WA (US); Jeffrey R. C. Bell, Seattle, WA (US); Bora Beran, Redmond, WA (US); Gaetan Issombo, Seattle, WA (US); Kori Inkpen Quinn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 13/710,464

(22) Filed: Dec. 11, 2012

(65) Prior Publication Data

US 2014/0164187 A1 Jun. 12, 2014

(51) Int. Cl.
*G06Q 30/00* (2012.01)
*G06Q 30/06* (2012.01)

(52) U.S. Cl.
CPC ..... *G06Q 30/0613* (2013.01); *G06Q 30/0625* (2013.01)

(58) Field of Classification Search
CPC . G06Q 30/00; G06Q 30/0601; G06Q 30/0613
See application file for complete search history.

(56) References Cited

U.S. PATENT DOCUMENTS

| | | | |
|---|---|---|---|
| 8,145,659 B1* | 3/2012 | Smith | G06F 17/30864 707/722 |
| 8,180,676 B2 | 5/2012 | Altberg et al. | |
| 2006/0122850 A1 | 6/2006 | Ward et al. | |
| 2006/0122917 A1* | 6/2006 | Lokuge | G06F 17/30861 705/27.1 |
| 2006/0184436 A1 | 8/2006 | Edalat Khah | |
| 2008/0046336 A1 | 2/2008 | Mosleh | |
| 2009/0192945 A1 | 7/2009 | Perpina et al. | |
| 2009/0265255 A1* | 10/2009 | Jackson | G06F 17/30973 705/26.1 |
| 2010/0153181 A1* | 6/2010 | Altunbasak | G06Q 10/0639 705/7.38 |
| 2010/0223044 A1 | 9/2010 | Gisby et al. | |
| 2010/0287242 A1 | 11/2010 | Kumar | |
| 2011/0267419 A1 | 11/2011 | Quinn et al. | |

(Continued)

OTHER PUBLICATIONS

"International Search Report & Written Opinion for PCT Patent Application No. PCT/US2013/074493", Mailed Date: Jul. 22, 2014, Filed Date: Dec. 11, 2013, 10 Pages.

(Continued)

*Primary Examiner* — Michael Misiaszek
*Assistant Examiner* — Christopher Seibert
(74) *Attorney, Agent, or Firm* — Christopher J. Volkmann; Kelly, Holt & Christenson, PLLLC

(57) ABSTRACT

A communication system provides a service provider marketplace that includes a data store storing provider data for a plurality of different service providers. A search or selection component provides user interface displays that allow users to search for and select service providers. A payment component provides a mechanism by which payment for the services can be made by the users.

19 Claims, 23 Drawing Sheets

(56) References Cited

U.S. PATENT DOCUMENTS

| | | |
|---|---|---|
| 2011/0270922 A1 | 11/2011 | Jones et al. |
| 2011/0313754 A1* | 12/2011 | Bastide ................ G06F 17/289 704/2 |
| 2012/0041832 A1 | 2/2012 | Sheth et al. |
| 2012/0179499 A1 | 7/2012 | Loeffen |
| 2013/0339431 A1* | 12/2013 | Yannakopoulos .. H04L 12/1827 709/204 |

OTHER PUBLICATIONS

Taylor, Colleen, "Babelverse Lands Seed Round Led by 500 Start-ups for Human-Powered Online Translation", Retrieved at http://langtechnews.hivefire.com/articles/share/207655/, Sep. 8, 2012, pp. 3.

"Amazon Mechanical Turk Marketplace for Small Tasks", Retrieved at http://amazon-mechanical-turk.appappeal.com/, May 10, 2010, pp. 15.

* cited by examiner

DIGITAL CONFERENCING SERVICES MARKETPLACE

BACKGROUND

Computer systems are being used, increasingly, in order to provide communication among users. Often, communication systems provide group meetings or other computing environments in which business people can communicate with one another, through the communication system, in order to conduct business. It is increasingly more common that these types of meetings involve transactions or other activity in which services may be needed.

However, current communication systems do not provide the ability to quickly and easily incorporate service providers into a communication session, or meeting (hereafter, the terms "communication session" and "meeting" will both mean a session in which two or more participants are communicating with one another, in real time, using a communication system). Instead, the services that may be desired for a given meeting are normally set up using a separate type of system. This can be quite cumbersome and time consuming, and is often unreliable.

By way of example, in an increasingly interconnected world, people often use communication systems to conduct communication sessions, in which the participants speak different languages. While there are many different types of people and translation services that provide translators for such meetings, it can be difficult and cumbersome to engage them to provide services for a communication session. Normally, one or more of the meeting participants, or other support personnel, must independently contact a translation service provider and arrange the details for the translation service provider to become a participant in the meeting and to provide the translation services.

More generally stated, it is currently difficult to match up service providers with people who desire immediate, real-time, services when conducting a communication session or a meeting, using current communication systems. It will be noted that many such meetings are multi-party meetings in which three or more participants, all at different locations, participate in the meeting. This exacerbates the problem of providing a given service for the communication session, or meeting.

The discussion above is merely provided for general background information and is not intended to be used as an aid in determining the scope of the claimed subject matter.

SUMMARY

A communication system provides a service provider marketplace that includes a data store storing provider data for a plurality of different service providers. A search or selection component provides user interface displays that allow users to search for and select service providers. A payment component provides a mechanism by which payment for the services can be made by the users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
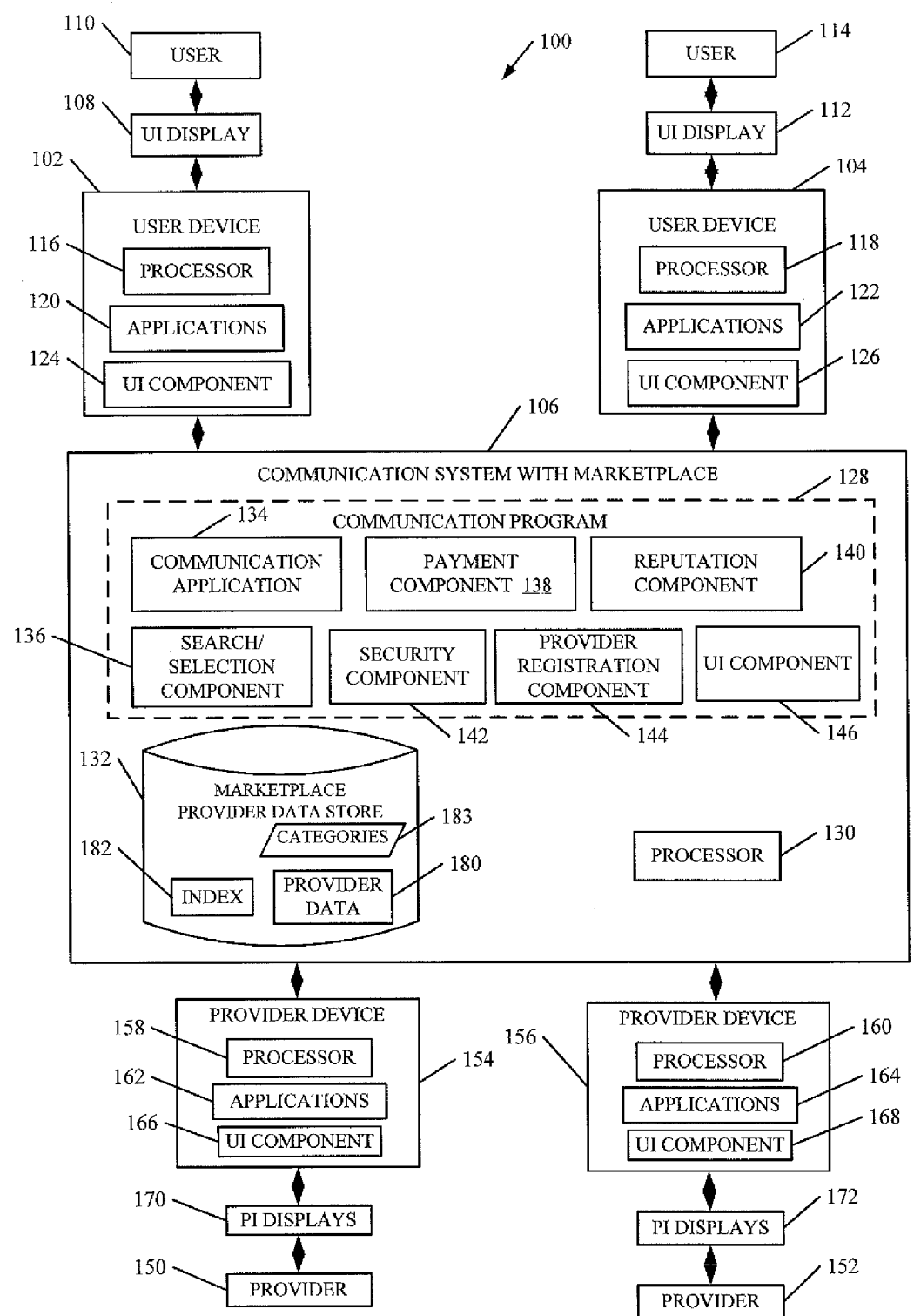
FIG. 1 is a block diagram of one embodiment of a communication system architecture.

FIG. 1 is a block diagram showing one embodiment of a communication system architecture 100. Architecture 100 includes user devices 102 and 104 that are connected to communication system 106. User device 102 generates user interface displays 108 so that user 110 can interact with, and manipulate other portions of architecture 100. User device 104 generates user interface displays 112 so that user 114 can do the same.

In one embodiment, users 110 and 114 participate in a meeting or communication session conducted using communication system 106. Each of user devices 102 and 104 include a processor 116 and 118, respectively. Further, each user device includes one or more applications 120, 122 and user interface components 124, 126.

Processors 116 and 118 are illustratively computer processors with associated memory and timing circuitry (not separately shown). They are a functional part of the corresponding user devices 102 and 104 and are activated by, and facilitate the functionality of, other applications, components, or other items on the user interface devices.

Applications 120 and 122 illustratively provide application functionality to user devices 102 and 104. In one embodiment, applications 120 and 122 each comprise a client communication application so that the corresponding users 110 and 114 can participate in the communication session (or meeting) using communication system 106.

User interface components 124 and 126 illustratively generate user interface displays 108 and 112. User interface displays 108 and 112 illustratively include user input mechanisms that receive user inputs from users 110 and 114, respectively. The user input mechanisms receive the user inputs to allow users 110 and 114 to participate in the communication session (or meeting). The user input mechanisms can take a wide variety of different forms. For instance, they can be text boxes, buttons, drop down menus, links, icons, or other user-actuatable elements. The particular input device that is used to actuate the user input mechanisms can also take a wide variety of different forms. For instance, in one embodiment, the user input device is a point and click device, such as a mouse or track ball. However, the user input device can also be a hardware or software keyboard or keypad, a microphone and speech recognition system so the user input mechanisms can be actuated by voice, and where the display screen that displays the user interface displays is a touch sensitive screen, the user input mechanisms can be actuated using touch gestures with the user's finger, a stylus, or with another device. These are listed by way of example only.

Communication system 106 illustratively includes communication program 128, processor 130 and marketplace provider data store 132. In the embodiment shown, communication program 128 includes a communication application 134, search/selection component 136, payment component 138, reputation component 140, security component 142, provider registration component 144 and user interface component 146. Components 138-144 illustratively comprise a marketplace system that is incorporated within communication program 128. It will of course be noted that it could also be incorporated directly within communication application 134 as well, and these are only two exemplary options. In any case, communication program 128 illustratively provides the functionality to facilitate a communication session (or meeting) between user's 110 and 114.

Processor 130 is illustratively a computer processor with associated memory and timing circuitry (not separately shown). It is a functional part of communication system 106 and is activated by, and facilitates the functionality of, other components, applications or items in communication system 106. It will be noted that while a single processor 130 is shown, multiple different processors can be used as well and the single processor is shown for the sake of example.

Marketplace provider data store 132 stores provider data 180, an index 182 of that data and categories 183 of services offered by various providers. It will also be appreciated that, while marketplace provider data store 132 is shown as a single data store within communication system 106, data store 132 can be outside of, or remote from, communication system 106 and accessed by communication system 106, as needed. Similarly, data store 132 can be a plurality of different data stores, all of which are located remotely from system 106, or some of which are located local to system 106 and some of which are located remotely.

System 106 is shown coupled to providers 150 and 152 through provider devices 154 and 156, respectively. Providers 150 and 152 are illustratively service providers that can provide services that accompany the communication session (or meeting) of users 110 and 114, or that are otherwise desired by one or more of users 110 and 114. Each of provider devices 154 and 156 include a processor 158 and 160, applications 162 and 164 and UI components 166 and 168.

The processors 158 and 160 are illustratively computer processors with associated memory and timing circuitry (not separately shown). They are illustratively functional parts of the their corresponding provider device (154 and 156) and are activated by, and facilitate the functionality of, other applications, components or items in the corresponding provider device.

Applications 162 and 164 illustratively include a provider communication application that allows providers 150 and 152 to register with communication system 106 and to provide services to communication sessions (or meetings) conducted using system 106. In doing so, UI components 166 and 168 illustratively generate provider interface PI displays 170 and 172, respectively. The provider interface displays illustratively include input mechanisms that can be actuated by providers 150 and 152, and that allow providers 150 and 152 to register with system 106 and to perform desired services. The input mechanisms and input devices can be the same as those discussed above with respect to UI displays 108 and 112, or they can be different.

Before describing the overall operation of architecture 100 in more detail, a brief explanation will be provided to enhance understanding. In one embodiment, users 110 and 114 illustratively launch communication applications either on or through user devices 102 and 104, respectively, in order to conduct a meeting with one another. During that meeting, the users 110 and 114 desire to have a service provided. For instance, assume that users 110 and 114 speak different languages and wish to have a translator provide translation services during the meeting. In that case, the users 110 and 114 (or either one of them) can access search/selection component 136 in communication system 106 in order to access a provider marketplace (a collection of providers that provide the desired services) to find a provider 150-152 to provide translations services. It is assumed that, prior to that, providers 150 and 152 have registered with communication system 106 (using registration component 144) and have stored provider data 180 in marketplace provider data store 132. The provider data 180 illustratively describes the services provided by providers 150-152. It can also include reputation information, which can be used by users in order to aid their selection of providers, or which can be used as ordering or filtering criteria in listing providers. The reputation information can also be used by the providers themselves in marketing their services. The provider data 180 is illustratively indexed and placed in index 182 so that it can be searched by component 136. Also, the services are illustratively categorized into categories 183 as well. In any case, search/selection component 136 provides information back to users 110-114 showing providers 150-152 that match the search request. A user 110-114 can select one of the providers returned or search for additional providers. Once a provider is selected, security component 142 can implement security and payment component 138 can provide mechanisms by which the services can be paid for by users 110-114. Further, reputation component 140 illustratively provides the ability for users 110-114 to provide feedback regarding a selected provider 150-152. Similarly, reputation component 140 also facilitates the ability of providers 150-152 to provide feedback regarding users 110-114, with whom they have worked.

Figure 2:
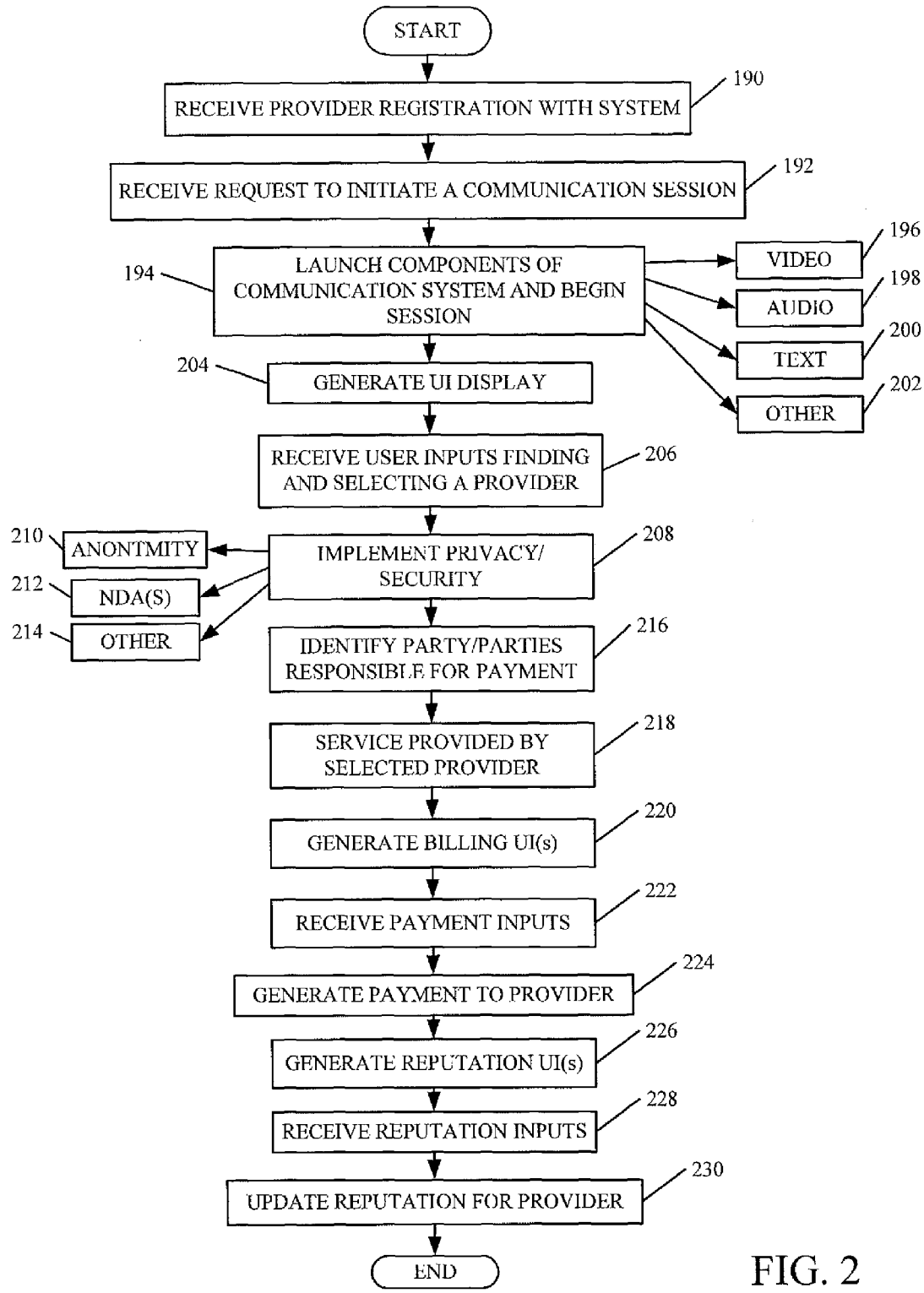
FIG. 2 is a flow diagram illustrating one embodiment of the overall operation of the system shown in FIG. 1.

FIG. 2 is a flow diagram illustrating one embodiment of the operation of architecture 100 in greater detail. Communication system 106 first uses provider registration component 144 to receive inputs from providers 150 and 152 so that they can register with system 106. This is indicated by block 190 in FIG. 2. Provider registration is discussed in greater detail below with respect to FIG. 3.

Communication system 106 then receives a request from one or more users 110-114 to initiate a communication session, or meeting. This is indicated by block 192. By way of example, assume that user 110 wishes to initiate a meeting with user 114. User 110 can illustratively launch a communication application 120 on user device 102, or access a communication application 134 in communication system 106, or both. The communication application illustratively generates a suitable user interface display 108 that allows user 110 to request initiation of the meeting.

Communication system 106 then launches components of communication system 106 and begins the session. This is indicated by block 194 in FIG. 2. It will be noted that the communication system can take a wide variety of different forms. For example, it can be a video (or audio visual) communication system, such as an on-line meeting system with a webcam, as indicated by block 196. It can also simply be an audio meeting indicated by block 198. It can be a text meeting system indicated by block 200 or it can be another type of meeting system indicated by block 202.

The communication application generates a user interface display that allows the user 110 to search for and select a service provider 150-152, based upon the information in data store 132. Generating the user interface display to find and select a provider is indicated by block 204 in FIG. 2. The user interface display illustratively includes user input mechanisms that allow user 110 to provide search criteria and to search for one or more providers 150-152, and then to select a given provider to perform a given service. This is indicated by block 206 in FIG. 2. It will be noted that two or more providers may be selected as well. For instance, if the attendees of the meeting need a translator to translate languages, but would also like the meeting to be transcribed, they may select one provider as a translator and another provider as a dictation or transcription service. Of course, these are exemplary only.

Security component 142 can then implement any desired security, or predefined security measures, as well. Privacy considerations can be taken into account by component 142 also. This is indicated by block 208 in FIG. 2. For instance, it may be that various providers 150-152 wish to remain anonymous. That is, they may wish to provide services without the users knowing their identity. Similarly, one or more of users 110-114 may wish to remain anonymous in that they do not wish to have any selected providers or other users know their identity. Anonymity is indicated by block 210 in FIG. 2. Similarly, it may be that the content being discussed at the communication session (or meeting) is sensitive or confidential. It that case, it may be that the selected providers are to execute a non-disclosure agreement or other type of confidentiality agreement. Security component 142 can tender the agreement for signature by the providers. This is indicated by block 212 in FIG. 2. Of course, other privacy or security measures can be implemented as well, and this is indicated by block 214.

Payment component 138 then illustratively generates user interface displays for users 110-114 that allow users 110-114 to identify the party or parties that are going to be responsible for paying for the services. This is indicated by block 216 in FIG. 2. For example, it may be that both parties 110-114 wish to pay equal amounts. Similarly, it may be that only one party is going to pay, or that the parties are going to pay based upon their participation in the meeting. A wide variety of other payment scenarios are contemplated herein, and payment component 138 illustratively generates the user interface displays that allow users 110-114 to pay in a desired way.

Communication application 134 then facilitates the meeting or communication session, and allows any selected providers to provide their services. This is indicated by block 218 in FIG. 2. When the communication session or the services are completed, or otherwise terminated, payment component 138 again illustratively generates user interface displays that allow one or more of users 110-114 to confirm billing. This is indicated by block 220 in FIG. 2. The users 110-114 illustratively provide the appropriate payment inputs, such as by inputting a credit card number (if it was not already input), by confirming an amount, by identifying an on-line payment service to be used, etc. This is indicated by block 222 in FIG. 2. Payment component 138 then generates payments to the selected providers, as previously agreed on and this is indicated by block 224 in FIG. 2. It will be noted that prepayment can be done as well, and payment after the services are provided is only one example.

Reputation component 140 then illustratively generates reputation user interface displays that allow either users 110-114, or selected providers 150-152 (or both) to provide inputs that can be used to calculate a reputation rating for the others. A reputation rating may include official certifications, but it may not as well. For instance, users 110-114 may provide inputs indicative of what they thought of the quality of service provided by the selected providers. Similarly, providers 150-152 may provide inputs indicating how easy it was to work with users 110-114, how quickly they paid, etc. Generating the reputation user interface displays is indicated by block 226, and receiving the reputation inputs is indicated by blocks 228 in FIG. 2. Once the relevant reputation inputs are received, reputation component 140 illustratively updates the reputation ranking (or other reputation indicia) for the corresponding users 110-114 or providers 150-152, or both, and stores it in data store 132, or in another data store so it can be accessed by other users, providers or both. This is indicated by block 230 in FIG. 2.

Figure 3:
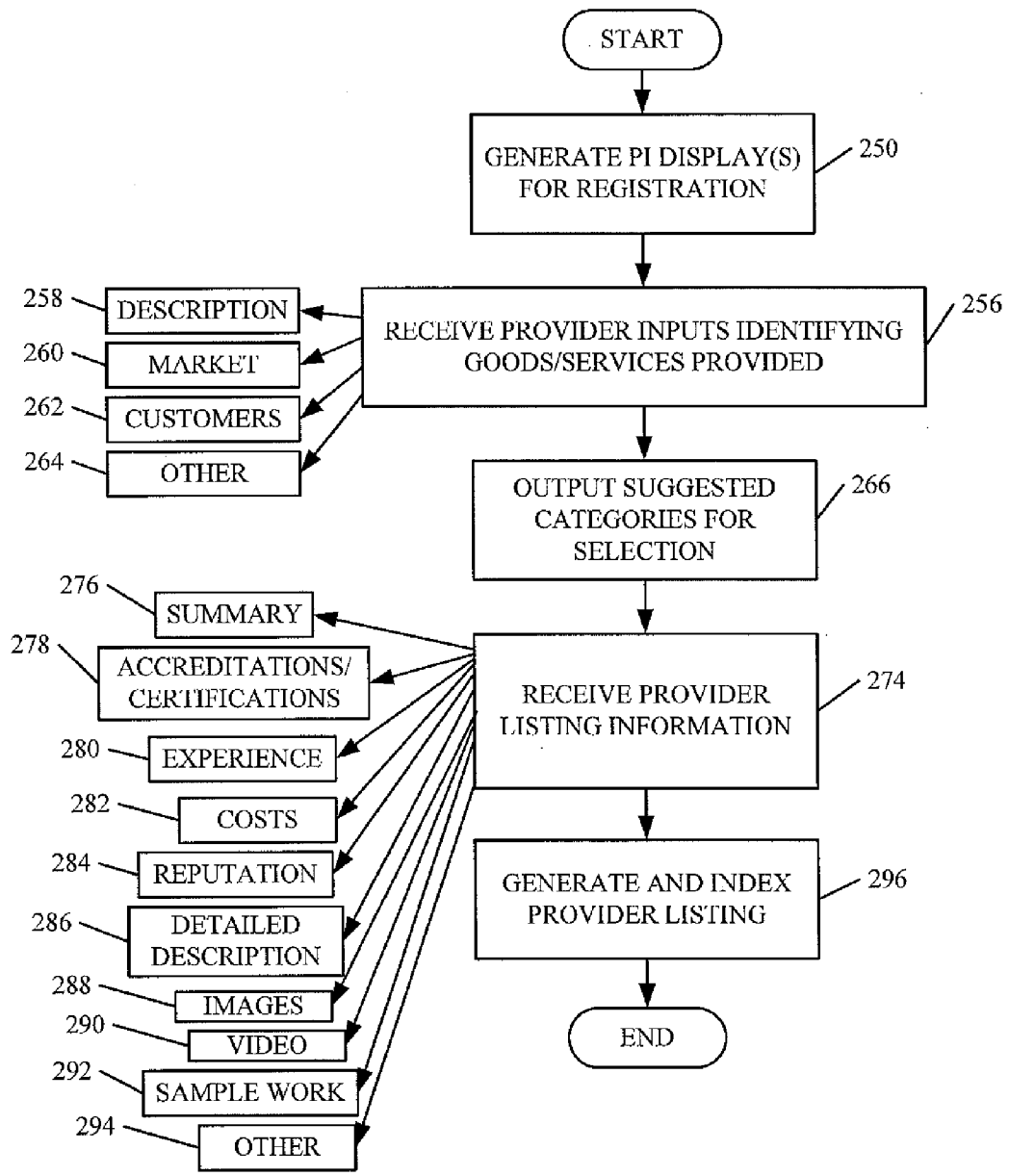
FIG. 3 is a flow diagram illustrating one embodiment of the operation of the system in FIG. 1 in conducting service provider registration.
Figure 3A:
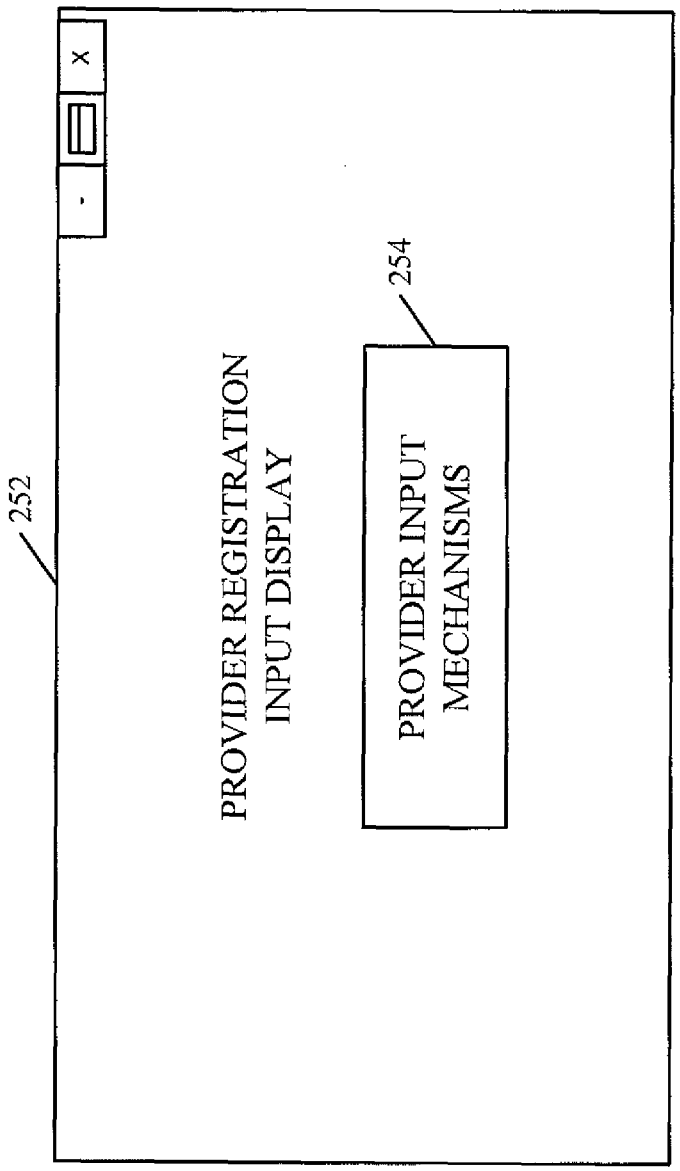
FIGS. 3A and 3B are exemplary user interface displays.

FIG. 3 is a flow diagram illustrating one embodiment of the operation of provider registration component 144, in allowing providers to register with system 106, in more detail. In one embodiment, in order for a provider to register with system 106 (for example, in order for provider 150 to register with system 106), provider 150 launches a provider application 162 which generates a provider input display 170 that has input mechanisms that allow provider 150 to register. Generating the provider input display is indicated by block 250 in FIG. 3. FIG. 3A shows one embodiment of a provider registration input display 252 that includes provider input mechanisms 254. Provider input mechanisms 254 allow provider 150 to provide information to provider registration component 144 so that provider registration component 144 can identify possible categories of services under which provider 150 wishes to register.

Provider 150 provides the information using provider input mechanisms 254. This is indicated by block 256 in FIG. 3. Some inputs that may be provided through provider input mechanisms 254 include a description of the goods or services provided as indicated by block 258, a description of the market served by provider 150 as indicated by block 260, a definition or description of the customers that may wish to obtain services from provider 150, as indicated by block 262, or other inputs as indicated by block 264.

Provider registration component 144 then takes those inputs and searches data store 132, and specifically categories 183 to identify categories of services that may be suitable for provider 150. These categories are output and displayed for provider 150 so that they can be selected by provider 150. Outputting the suggested categories for selection is indicated by block 266 in FIG. 3.

Figure 3B:
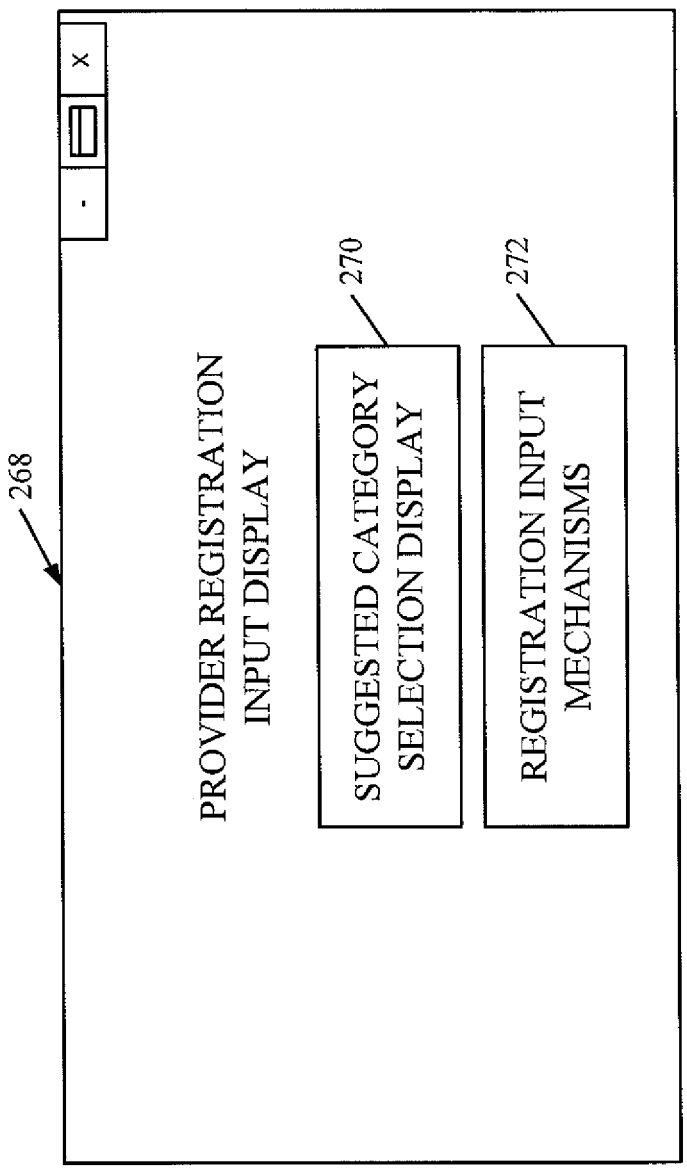

FIG. 3B shows one illustrative user interface display 268 that can be used to do this. Provider registration input display 268 includes suggested category selection display 270. Display 270 illustratively includes mechanisms that identify various categories that provider 150 can register in, and also provides mechanisms for provider 150 to select those categories. Once one or more categories are selected, provider 150 can provide listing information through registration input mechanisms 272. Receiving provider listing information at provider registration component 144 is indicated by block 274 in FIG. 3.

Of course, the provider listing information can take a wide variety of different forms. For instance, the listing information can include summary 276, a listing of accreditations, certifications, or other credentials 278, provider experience 280, cost information 282, reputation information 284, a detailed description of the services offered by provider 150, as indicated by block 286, images 288, videos 290, sample work 292, or other listing information 294. Provider registration component 144 illustratively receives all of this information and generates a provider listing and stores the provider listing as provider data 180 in market place provider data store 132. Provider registration component 140 then indexes that information and stores it in index 182, so that users 110-114 can locate provider 150 in subsequent searches. Generating and indexing the provider listing is indicated by block 296 in FIG. 3.

Figure 4:
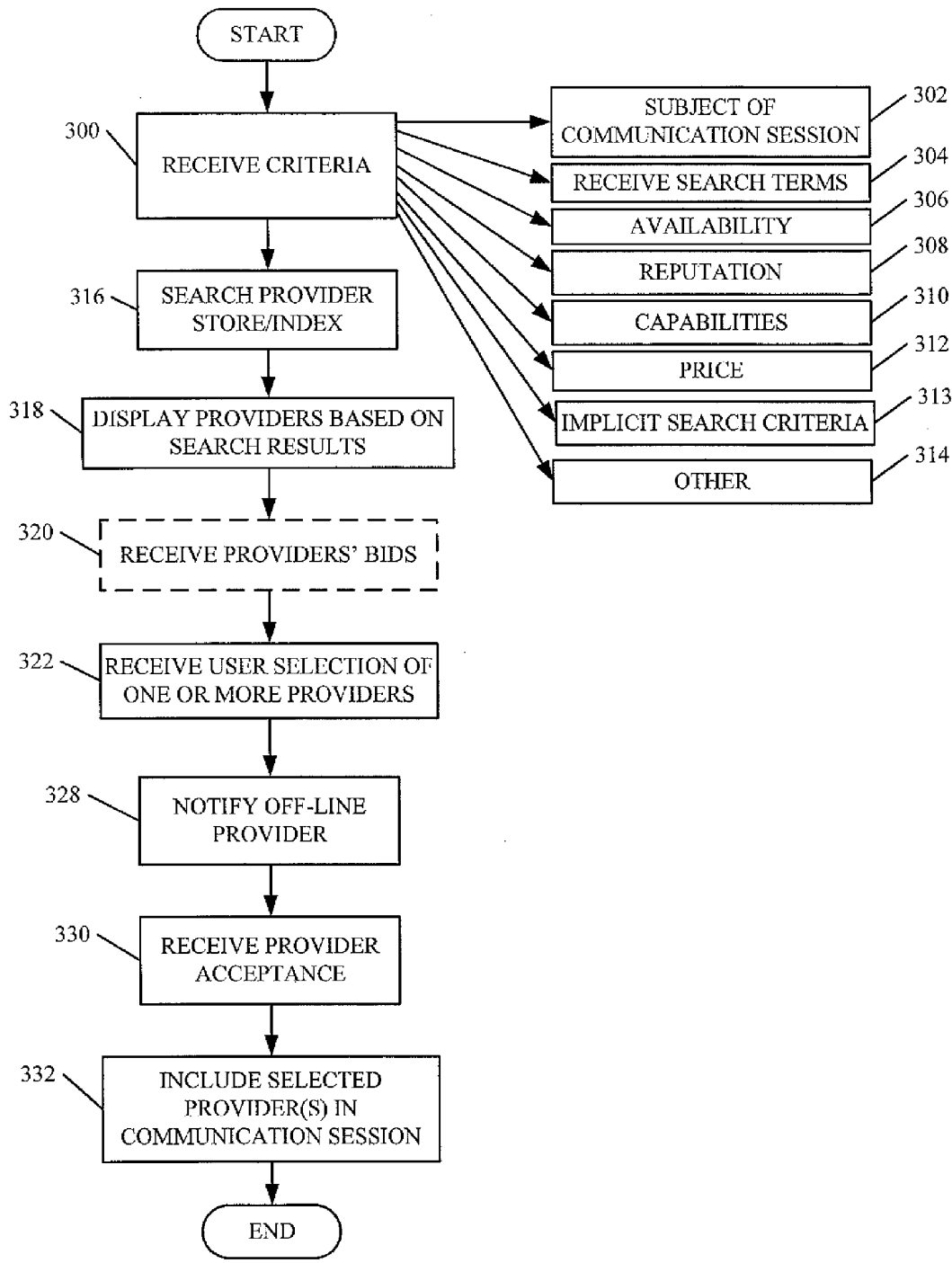
FIG. 4 is a flow diagram illustrating one embodiment of the operation of the system shown in FIG. 1 in facilitating provider search and selection.

FIG. 4 is a flow diagram illustrating one embodiment of the operation of search/selection component 136, in allowing one of users 110-114 (for example user 110) to search for and select one or more providers 150-152. Search/selection component 136 illustratively generates a user interface display that allows a user 110 to input criteria for identifying one or more providers 150-152. Receiving the criteria at search/selection component 136 is indicated by block 300 in FIG. 4. Selection criteria can be any of a wide variety of different criteria. For instance, when users 110-114 set up the communication session (or meeting), they may provide, in a meeting request, a topic subject matter line identifying what is to be discussed at the meeting. The topic or subject matter line can be used as criteria for identifying potentially relevant service providers. The topic or subject of the communication session is indicated by block 302 in FIG. 4.

Similarly, the search criteria can be provided in the form of a search query as well. That is, user 110 can provide search terms or keywords through a text box or other user input mechanism on UI displays 108. Search terms are indicated by block 304 in FIG. 4.

User 110 may also search based on the availability of the service providers. This is indicated by block 306. User 110 may search based on a wide variety of other criteria as well, such as the reputation 308, capabilities 310, and price 312 corresponding to a given provider, and as set out in the provider data 180 in data store 132. Other provider search criteria can be used as well, and this is indicated by block 314.

There is also a useful case in which the user does not initiate an explicit search. Instead, an implicit search is initiated based on their actions, such as connecting to a client in another country known to speak a different language or where the client is known to prefer a different language. In such a case, a list of providers for the implied translation service need may be offered based on some combination of implied search criteria 313 (such as the specific languages of translation potentially needed, the need for a provider with a passable reputation, the need for a provider available now) and criteria stored in the profiles of one or more users (such as payment thresholds or methods) and other criteria the system may choose to apply (such screening out higher-priced or lower-rated offerings).

It will also be noted that, where the user explicitly inputs or identifies the search criteria, the search criteria can be input by the user in different ways as well. For instance, the user can type the search terms, choose from among hierarchical categories of search criteria, or choose from a list of service providers that is presented based on previously used services, for instance.

Once the search criteria are received by search/selection component 136, component 136 searches data store 132 for relevant providers. Searching the indexed provider data 180 in index 182, in data store 132 is indicated by block 316 in FIG. 4.

Having identified potentially relevant providers, search/selection component 136 generates a user interface display 108 that displays the search results to user 110. This is indicated by block 318 in FIG. 4.

Figure 4A:
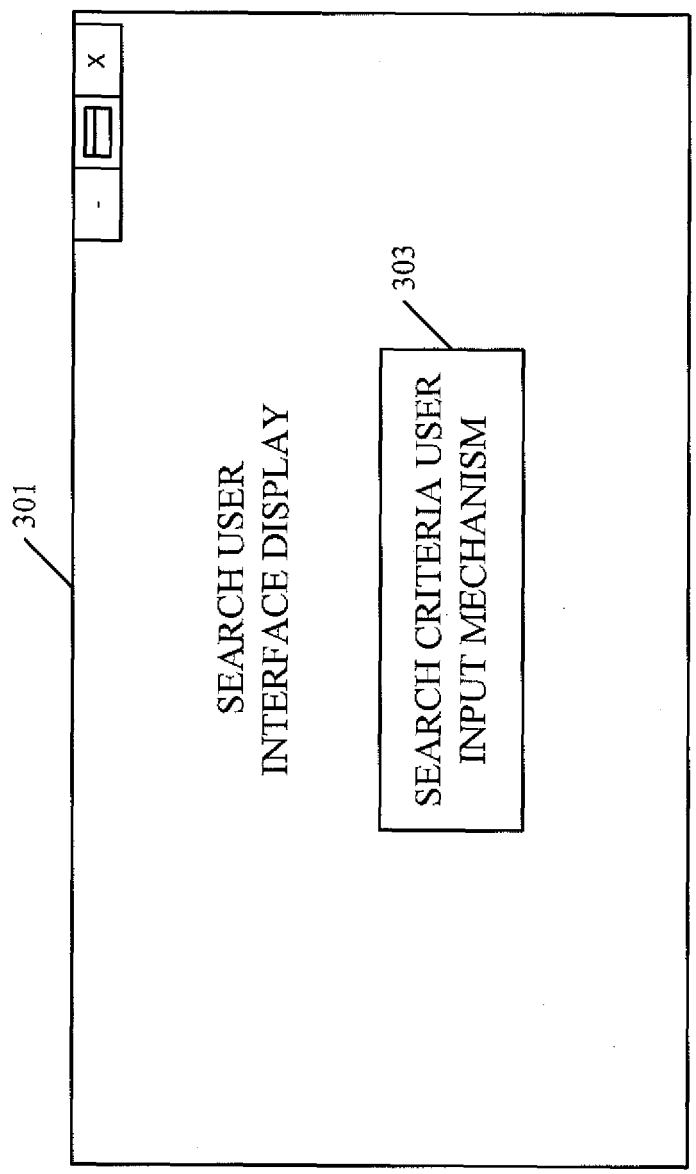
FIGS. 4A-4C are illustrative user interface displays.

FIG. 4A shows one embodiment of a user interface display 301. User interface display 301 illustratively includes search criteria user input mechanisms 303 that allow user 110 to input the search criteria. The input mechanisms 303 can be a wide variety of different types of user input mechanisms, such as a text box, check boxes associated with predefined search or filter criteria, buttons, selectable items in a dropdown menu, etc.

It will be appreciated that user 110 can select one or more providers in a variety of different ways. For instance, if user 110 sees a plurality of acceptable providers in the results, user 110 may allow the acceptable providers to be notified and to bid on the services for the meeting being arranged by user 110. For instance, it may be that user 110 provides a description of the services desired, and that can be provided, through search/selection component 136, to a set of providers that are identified by user 110 as being acceptable. Those providers then illustratively have a limited amount of time (such as a minute, five minutes, etc.) within which to respond with a bid for the services. Bids are illustratively displayed on user interface displays 108 to user 110, along with the provider that is submitting the bid. User 110 can then select a provider by actuating a corresponding link on the user interface display, or in any other desired way as well. Receiving provider bids is indicated by block 320 in FIG. 4. At some point, user 110 illustratively selects one or more providers for providing services. This is indicated by block 322 in FIG. 4.

Figure 4B:
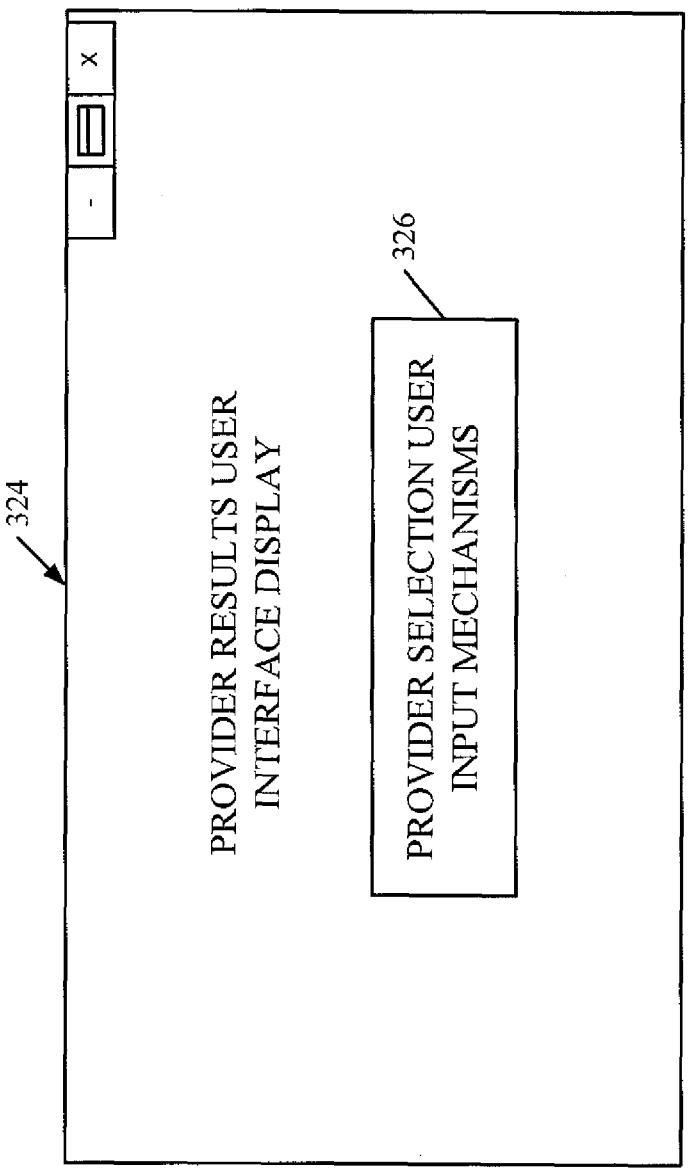

FIG. 4B shows one embodiment of a provider results user interface display 324 that includes provider selection user input mechanisms 326. User interface display 324 not only displays the results of the provider search (or results of the bid process), but also includes the provider selection user input mechanisms 326 that allow user 110 to select one or more of the providers. Again, user input mechanisms 326 can include check boxes, actuable links, buttons, icons, etc. In any case, actuation of one or more of the mechanisms indicates that user 110 has selected one or more service providers to provide services.

Figure 4C:
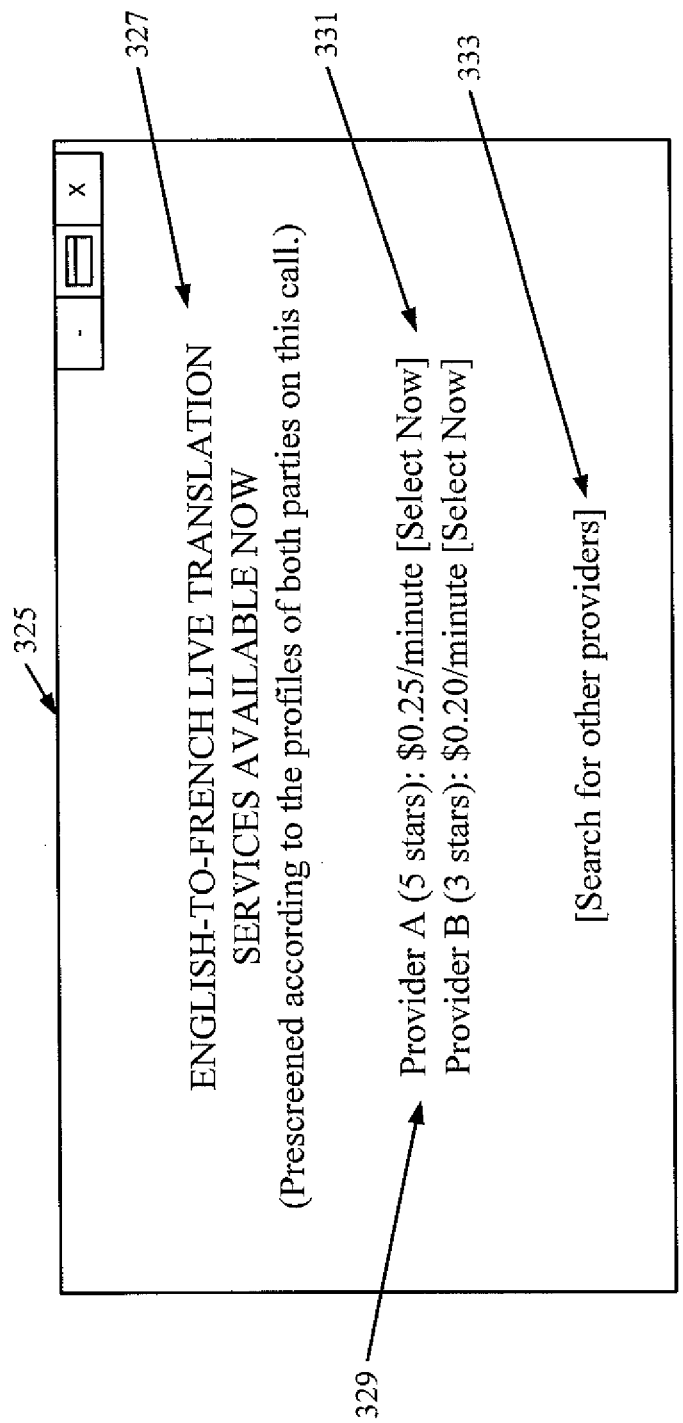

FIG. 4C shows one specific example of a provider results user interface display 325. Display 325 has a service description portion 327 and a list of providers 329. Each provider in list 329 has a selection button 331. The display 325 also has a further search button 333. This is but one exemplary embodiment.

If a selected service provider happens to be off-line at the time of selection, search/selection component 136 illustratively notifies the off-line provider and gives the off-lien provider a predetermined amount of time to respond. This can be done in a variety of different ways. For instance, it may be that the provider data 180 includes a cellular telephone number, an email address, or other mechanisms for notifying a provider. In that case, search/selection component 136 notifies the provider and indicates to the provider that the provider has a certain amount of time within which to respond. Notifying an off-line provider is indicated by block 328 in FIG. 4.

Once the provider is selected, component 136 generates a provider input display to the selected provider and allows the selected provider an opportunity to accept or to decline the selection. This is indicated by block 330 in FIG. 4. This can also be done in a variety of different ways, such as by simply generating a display describing the services that are sought, along with optionally the identity of the users that are requesting the services, and providing an accept/decline user input mechanism. Of course, other ways of doing this can be used as well.

Once the selected provider has been selected and accepts, the provider is included in the communication session between users 110 and 114, as needed in order to perform the desired services. This is indicated by block 332 in FIG. 4. By way of example, if the provider provides translation services, the provider may be included in the audio only, or audio and visual, portions of the meeting, and also be given additional functionality. For instance, it may be that the provider is given functionality to pause, rewind and replay audio information. If a translator is translating sign language, it may be that the functionality can be provided for the video information as well. Further, the selected provider may have functionality needed to perform document and screen sharing or participate using a telepresence robotic mechanism, or in other ways. In any case, the selected provider is included with functionality that is used to perform the desired services.

Figure 5:
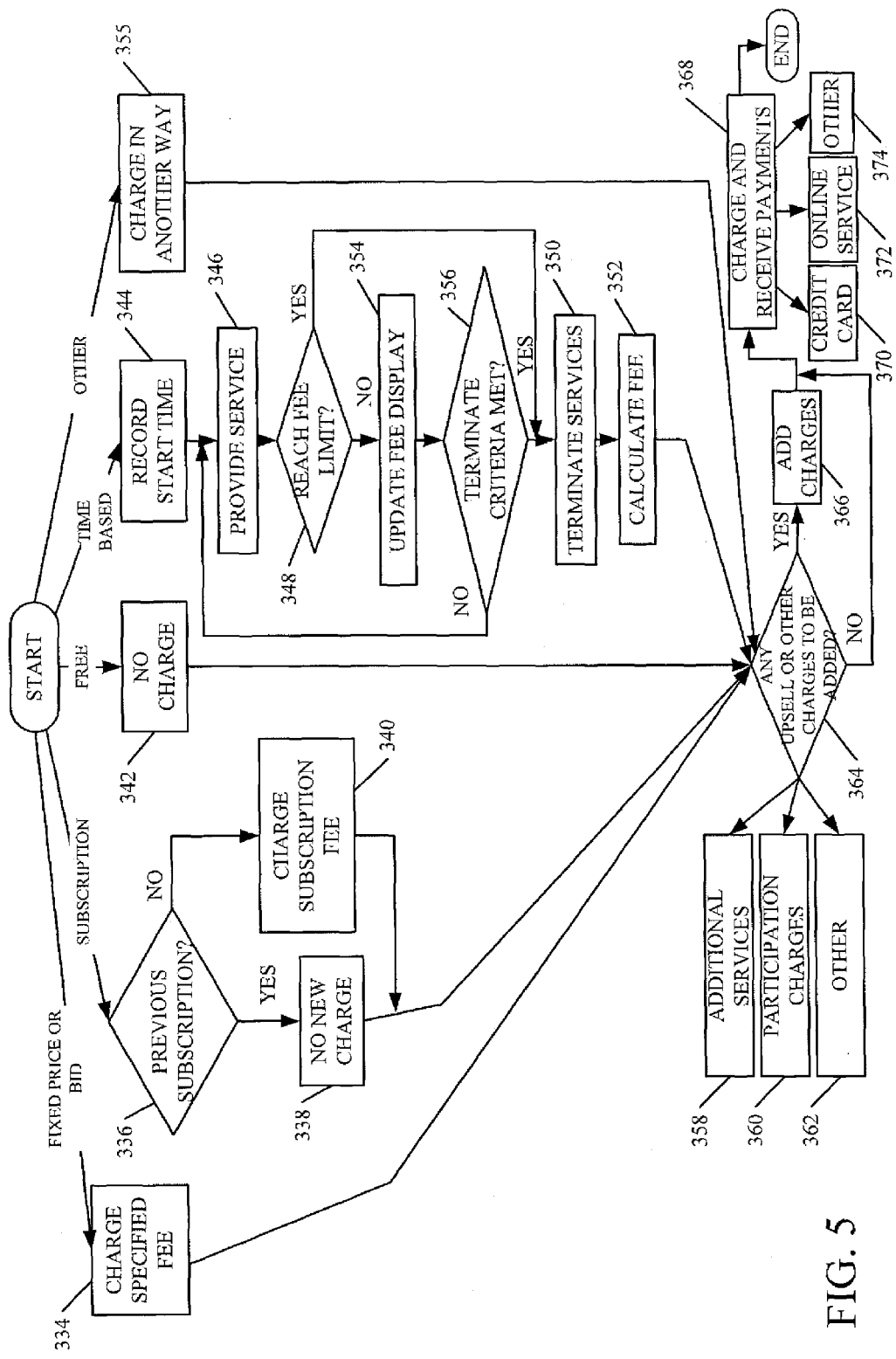
FIG. 5 is a flow diagram illustrating one embodiment of the operation of the system shown in FIG. 1 in generating charges to users for using services.

FIG. 5 is a flow diagram illustrating a variety of different ways that payment component 138 can facilitate payment. It will be noted that payment can be made in a variety of different ways. For instance, the providers can quote a fixed price or bid on the services. Similarly, the providers can offer subscriptions where a certain level of services will be provided for a monthly or yearly subscription fee or for another type of subscription fee. Further, providers may offer free services in exchange for filling out a reputation ranking or for other reasons. Of course, the fees can be time based or they can be determined in other ways as well.

FIG. 5 shows that when the fee is a fixed price or bid fee, payment component 138 simply charges the specified fee. This is indicated by block 334 in FIG. 5.

When the fee to be charged is a subscription fee, payment component 138 illustratively determines whether the current user already has a subscription or is subscribing now. This is indicated by block 336 in FIG. 5. If the user has a previous subscription, then no new fee needs to be charged, as indicated by block 338. However, if the user is a new subscriber, then component 138 charges the subscription fee, as indicated by block 340.

When the provider is providing the services for free, no fee is charged, as indicated by block 342. Of course, when other compensation is provided (such as filling out a reputation ranking, etc.) those steps are also taken by payment component 138, or another component in system 106, as well.

When the fee charged is time based, it varies based on the amount of time that the provider is providing services. For instance, if the services provided are legal consulting services from a lawyer, the fee charged may depend upon the amount of time that the lawyer spends on the meeting. It may also be that if the services are transcription services or translation services, the fee charged may also be related to the time spent in the meeting. Of course, a wide variety of other types of time-based fees are contemplated as well. In any case, where the fees charged are time-based fees, payment component 138 records the start time as indicated by block 344. The service provider then provides services during the meeting, and this is indicated by block 346.

The time for which fees are charged can be terminated in a number of different ways. It may be, for instance, that a particular user has provided a credit card that has a maximum fee limit. It may also be that the user has set a maximum fee that they wish to pay for the services. A maximum fee can be set in other ways as well. Payment component 138 can determine whether a fee limit or maximum fee has been reached. This is indicated by block 348 in FIG. 5. If so, then the services are terminated as indicated by block 350, and the fee is calculated as indicated by block 352.

Figure 5A:
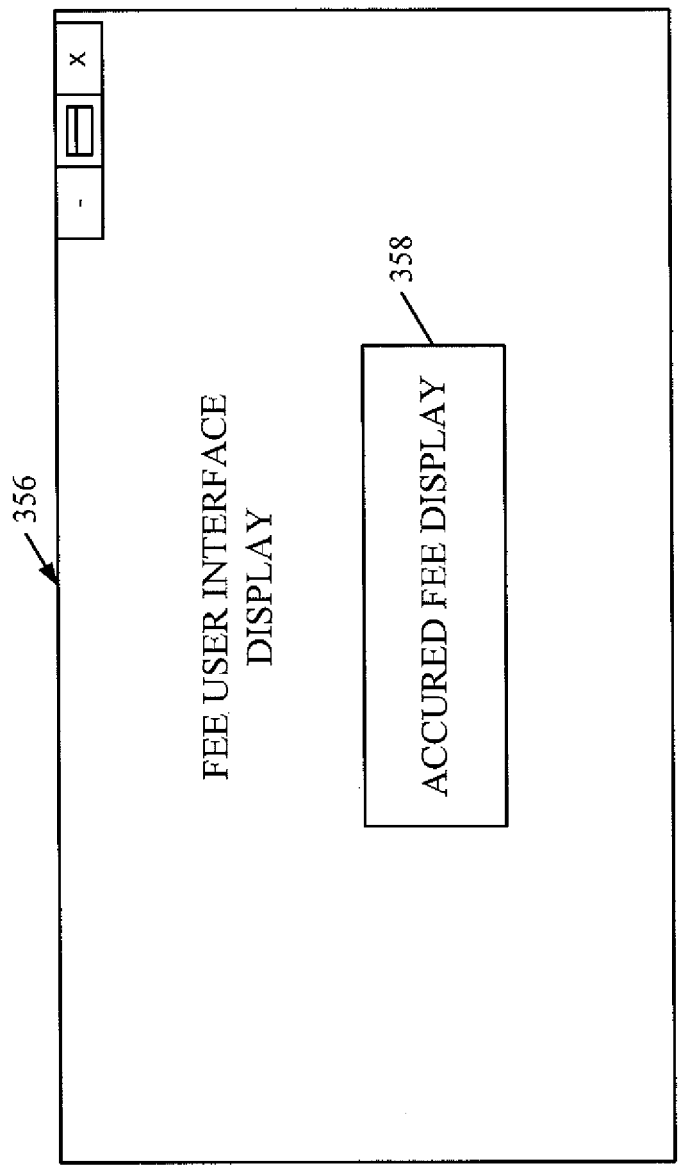
FIGS. 5A and 5B are illustrative user interface displays.

However, if, at block 348 no fee limit has been reached, then component 138 illustratively intermittently updates a display showing the amount of fees that have been accrued so far. This is indicated by block 354. FIG. 5A shows one embodiment of a fee user interface display 356. Fee user interface display 336 includes an accrued fee display mechanism 358. Accrued fee display mechanism 358 can be a wide variety of different types of displays, such as a bar chart, a pie chart, a simple numerical display, or another type of display that is indicative of the fees that have been accrued thus far. Display mechanism 358 can be intermittently updated either continuously, or in fee increments or in time increments that can be predefined or that can vary. The display can be updated in other ways as well.

Payment component 138 also determines whether any other termination criteria are met. This is indicated by block 356. The termination criteria can simply be that the communication session (or meeting) has been terminated. In addition, the termination criteria may be met when technical problems result in the provider's connection or a user's connection to the meeting being terminated. In one embodiment, a user or a provider can terminate the services at will, by simply providing a suitable user input indicating that the services are being terminated. A wide variety of other kinds of termination criteria can be used as well. In any case, if the termination criteria are met, processing continues at block 350 where the services are terminated, and block 352 where the fee is calculated.

It will also be appreciated that fees can be determined and charged in other ways. This is indicated by block 355.

Once the basic fee has been calculated, component 138 determines whether any additional charges or up-sell charges are to be added. For instance, in some payment systems, the providers are offered an opportunity to attempt to up-sell the users to additional services. By way of example, it may be that the services being provided are legal services, and the legal service provider may offer the user the opportunity to have the legal service provider draft a contract or agreement that reflects the results of the meeting. Drafting the agreement or contract may be an additional charge that is added to the fee for providing legal services during the meeting.

By way of another example, if the services being offered are translation services, the translation service provider can be given the opportunity to offer the user's a transcript of the meeting in one or more languages as well. These types of additional services or additional charges are indicated by block 358 in FIG. 5.

In another payment embodiment, the users can be charged additional fees, based upon their participation in the meeting. For instance, if the services being offered are translation services where the service provider translates various source languages into a target language, then the user that speaks the target language may pay more, because all of the translation is being done for that user's benefit. Similarly, the users that speak the source languages may be charged based upon how much they talk, because the translator will need to provide more services, the more that user participates in the meeting. Participation charges are indicated by block 360 in FIG. 5. Of course, other types of additional or up-sell charges are contemplated herein and this is indicated by block 362.

Determining whether any up-sell or other charges are to be added is indicated by block 364. If so, the charges are added as indicated by block 366. If not, processing skips to block 368 where the charges are made and payment is received from one or more of the users.

Payment can be made and received in a wide variety of different ways as well. For instance, a credit card payment transaction can be conducted as indicated by block 370. In addition, an online payment service can be used as indicated by block 372, or other payment mechanisms can be used as well, and this is indicated by block 374.

Figure 5B:
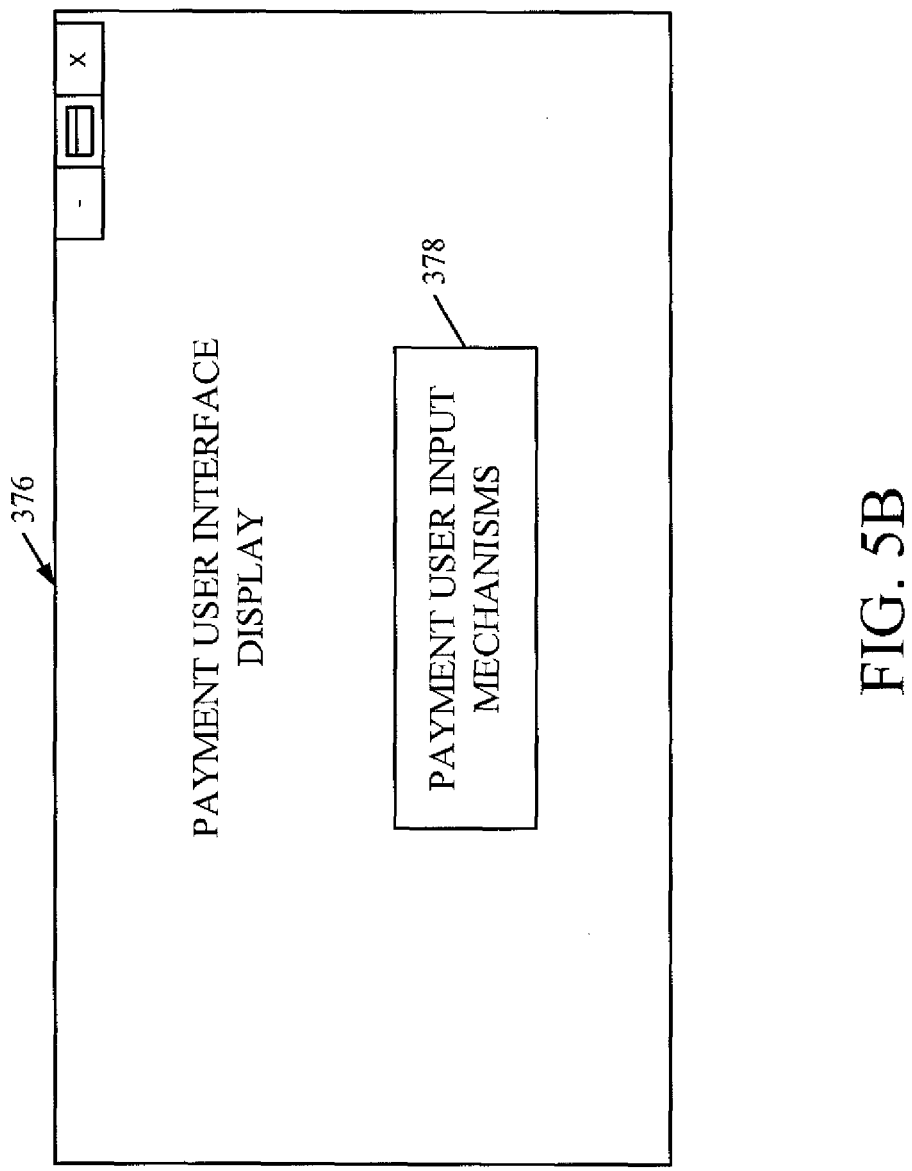

FIG. 5B shows one embodiment of a payment user interface display 376 that includes payment user input mechanisms 378. The particular embodiment of display 376 will vary, based upon the type of payment. If the payment is being made by credit card, then user input mechanisms 378 illustratively allow one or more users to input credit card information. If payment is to be made using an online payment service, then mechanisms 378 illustratively allow one or more users to provide authentication and payment information using the online service. These are discussed by way of example, and other payment methods can be accommodated as well.

Figure 6:
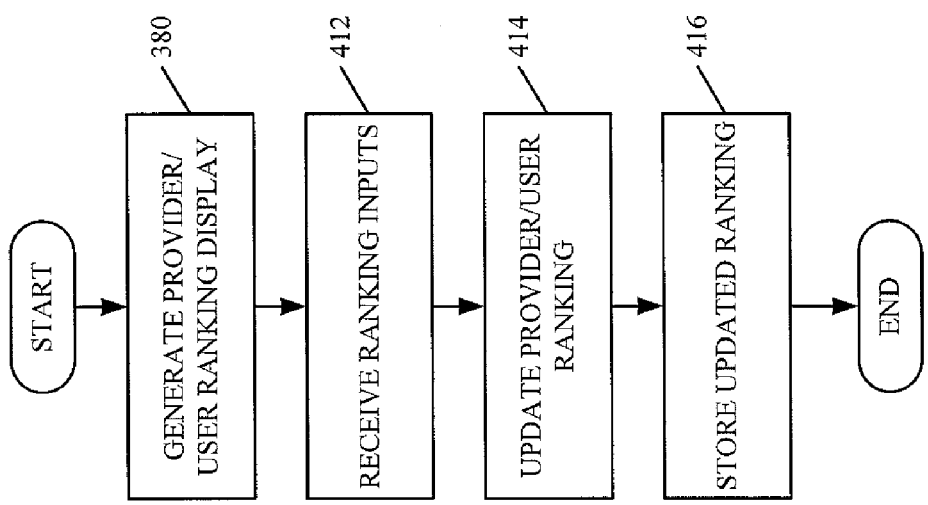
FIG. 6 is a flow diagram illustrating one embodiment of the operation of the system shown in FIG. 1 in receiving provider or user ranking inputs (or reputation inputs).

FIG. 6 shows one embodiment of a flow diagram illustrating the operation of reputation component 140 in more detail. At some point during or after the communication session, reputation component 140 illustratively generates a provider ranking display or user ranking display, or both, depending upon whether the user or provider (or both) are to be ranked. Generating the display is indicated by block 380 in FIG. 6.

Figure 6A:
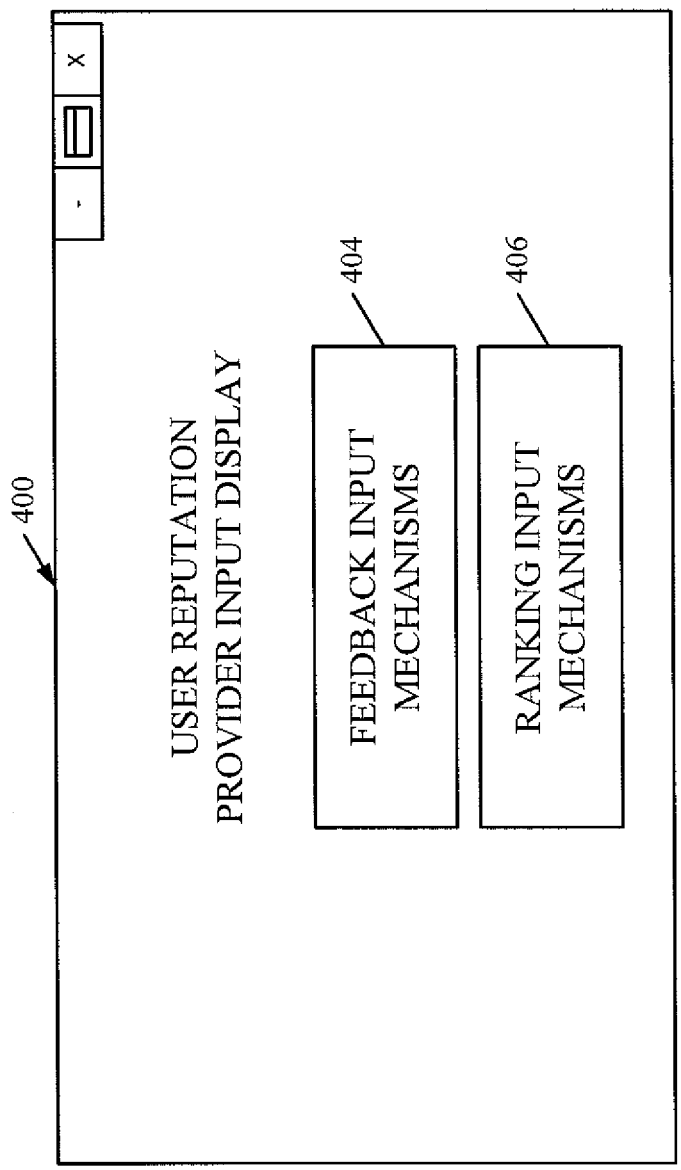
FIGS. 6A and 6B are illustrative user interface displays.
Figure 6B:
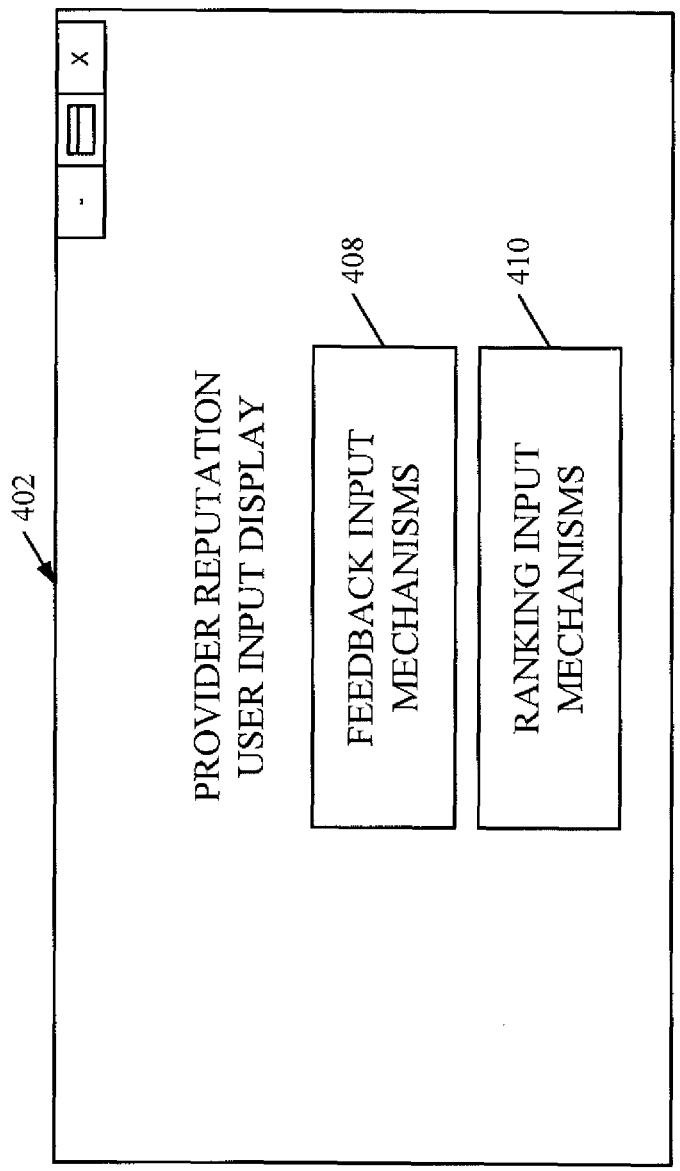

FIG. 6A shows one embodiment of a user reputation interface display 400 that is generated for a selected provider in order to rank a user. FIG. 6B shows a provider reputation interface display 402 that is displayed to a user to rank a given provider. Display 400 includes feedback user input mechanisms 404 that allow the provider to provide feedback (such as textual feedback, comments, liking or unliking, or other feedback user input mechanisms) to reputation component 140. Ranking input mechanism 406 illustratively allows the provider to assign a rank to the user being ranked. The rank may be on a star system in which the provider can select a number of stars corresponding to the user, a numerical ranking system in which the provider can assign a number corresponding to the user, or other mechanisms as well.

The same is true of display 402. Display 402 includes feedback input mechanisms 408 and ranking input mechanisms 410. Feedback input mechanisms 408 allow the user to provide feedback with respect to a given provider. The ranking input mechanisms 410 allow the user to rank the provider. Of course, reputation component 140 can generate any other types of input mechanisms to obtain other types of information used in calculating a reputation, ranking, accreditation, or other reputation-related information corresponding to a user or provider.

Once the relevant display is generated, component 140 receives the ranking inputs as indicated by block 412 in FIG. 6. Again, the ranking inputs can be a wide variety of different types of feedback inputs, numerical or star-based ranking inputs, or other information inputs that may affect the reputation of the user or provider.

Based upon the information received, reputation component 140 updates the provider ranking or user ranking as indicated by block 414. This can be done in a wide variety of different ways. For instance, where the ranking information received is a numerical ranking, that ranking can be averaged or otherwise algorithmically added into other rankings to obtain a new or updated ranking. Where the information is simply textual feedback, that information can be posted to a display that corresponds to the user or provider for which the feedback was received. A wide variety of other updating techniques can be used as well.

Finally, the updated ranking is stored in data store 132, or in any other data store. This is indicated by block 416 in FIG. 6.

It can thus be seen that communication system 106 provides a service marketplace for service providers that can be integrated within a communication program, or even within a communication application itself. This allows users of the communication system to quickly and easily identify and engage service providers, within the communication system. This alleviates the need to conduct external searches for, and engagements of, service providers, and thus makes obtaining services less cumbersome.

Figure 7:
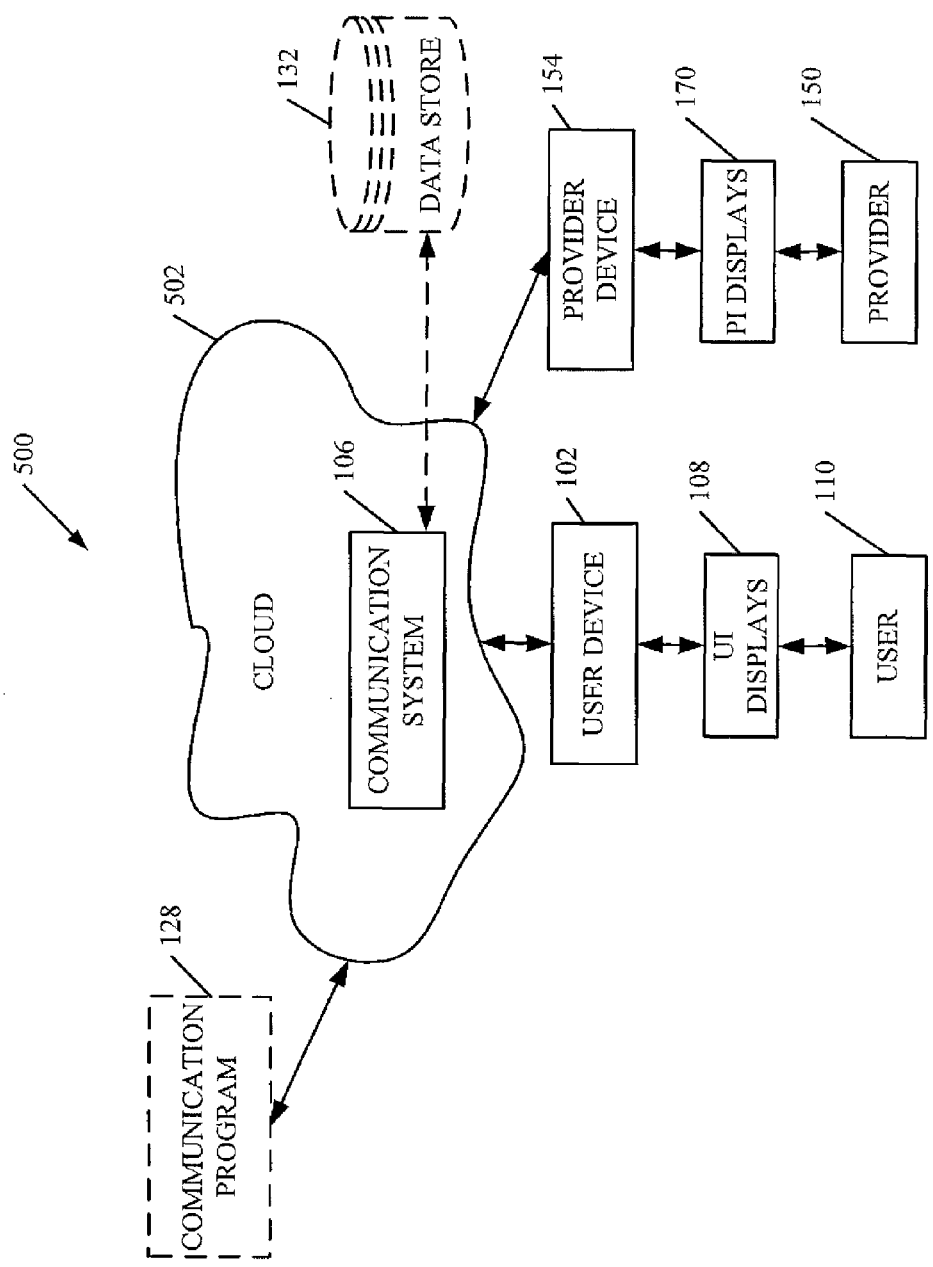
FIG. 7 is a block diagram showing the system of FIG. 1 in various architectures.

FIG. 7 is a block diagram of a portion of communication architecture 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that system 106 is located in cloud 502 (which can be public, private, or a combination where portions are public while others are private). Therefore, user 110 uses a user device 102 to access those systems through cloud 502. Provider 150 uses provider device 154 to access communication system 106 through cloud 502 as well.

FIG. 7 also depicts another embodiment of a cloud architecture. FIG. 7 shows that it is also contemplated that some elements of communication system 106 are disposed in cloud 502 while others are not. By way of example, data store 132 can be disposed outside of cloud 502, and accessed through cloud 502. In another embodiment, communication program 128 is also outside of cloud 502. Regardless of where they are located, they can be accessed directly by devices 102 and 154, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100 and system 106, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
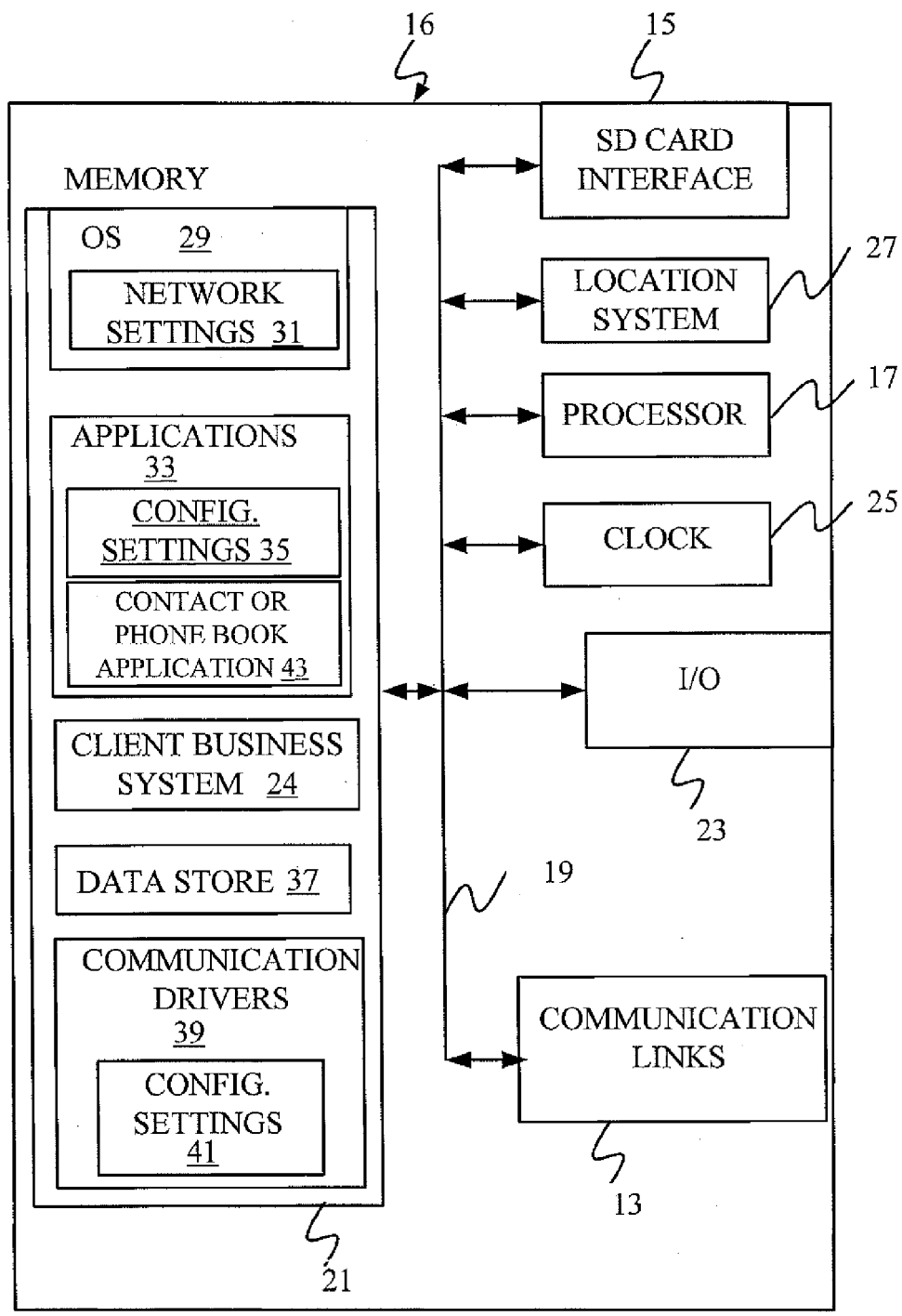
FIGS. 8-12 show illustrative mobile devices.

FIG. 8 is a simplified block diagram of one illustrative embodiment of a handheld or mobile computing device that can be used as a user's or client's hand held device 16, in which the present system (or parts of it such as client device 102 or provider device 154) can be deployed. FIGS. 9-12 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 106 or applications 120, 122, 134, 162, 164) are received on a removable Secure Digital (SD) card that is connected to a SD card interface 15. SD card interface 15 and communication links 13 communicate with a processor 17 (which can also embody processors 116, 118, 130, 158, 160 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 106 or the items in data store 132, for example, can reside in memory 21. Similarly, device 16 can have a client communication system 24 which can run various applications or embody parts or all of system 106 or architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
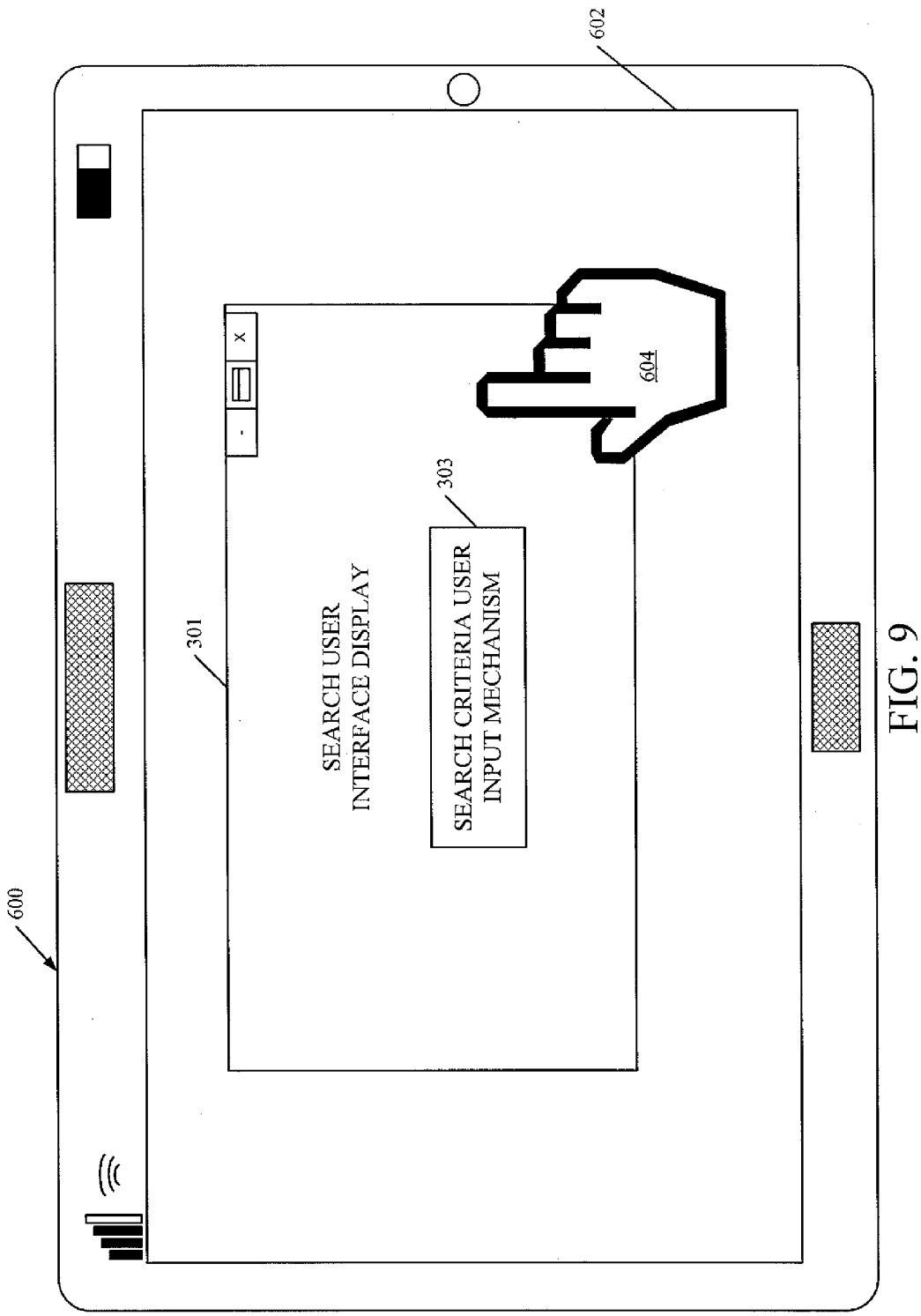
Figure 10:
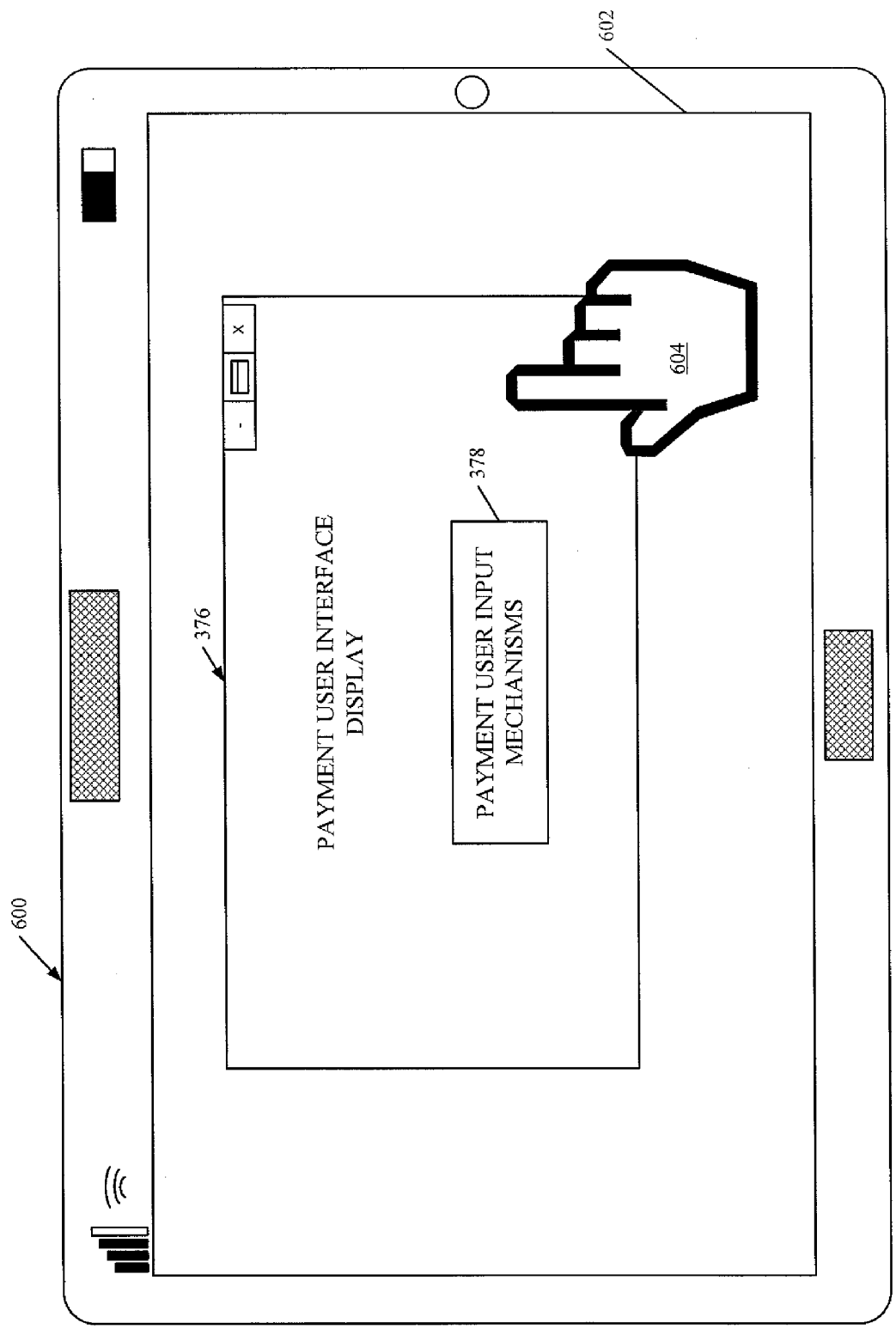

FIGS. 9 and 10 show one embodiment in which device 16 is a tablet computer 600. In FIG. 9, computer 600 is shown with the user interface display from FIG. 4A displayed on the display screen 602. FIG. 10 shows computer 600 with the user interface display from FIG. 5B displayed on display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 11:
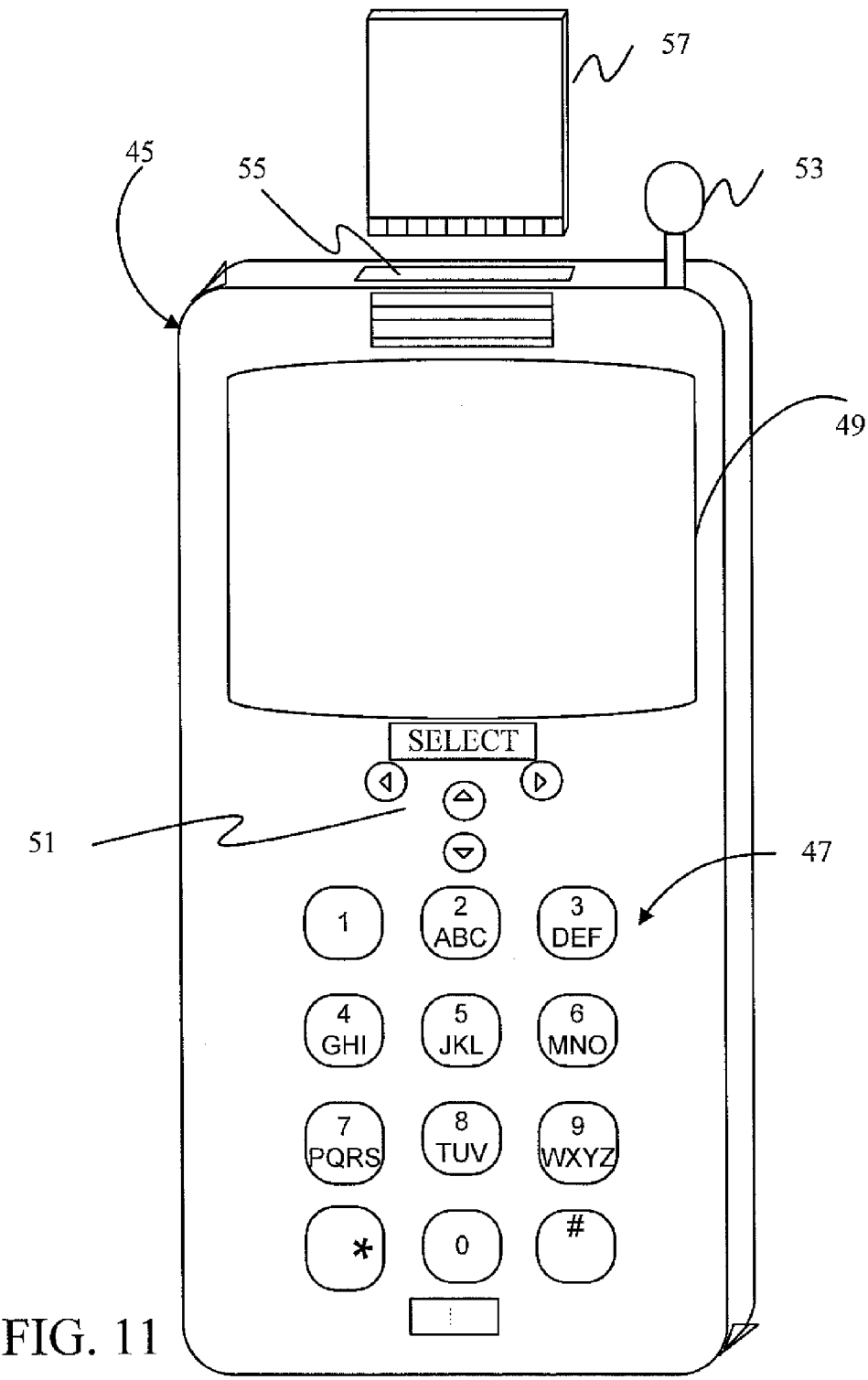
Figure 11A:
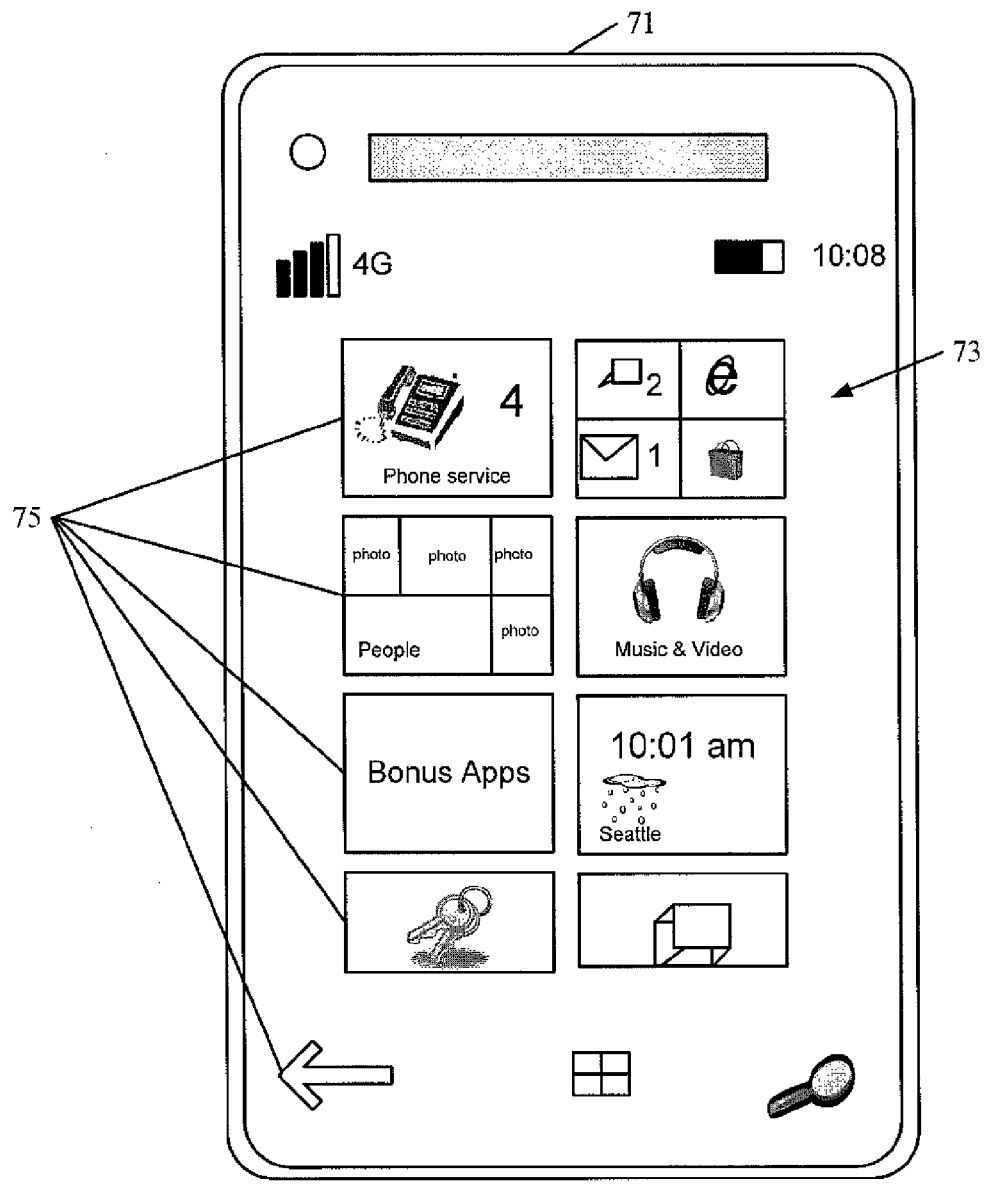
Figure 12:
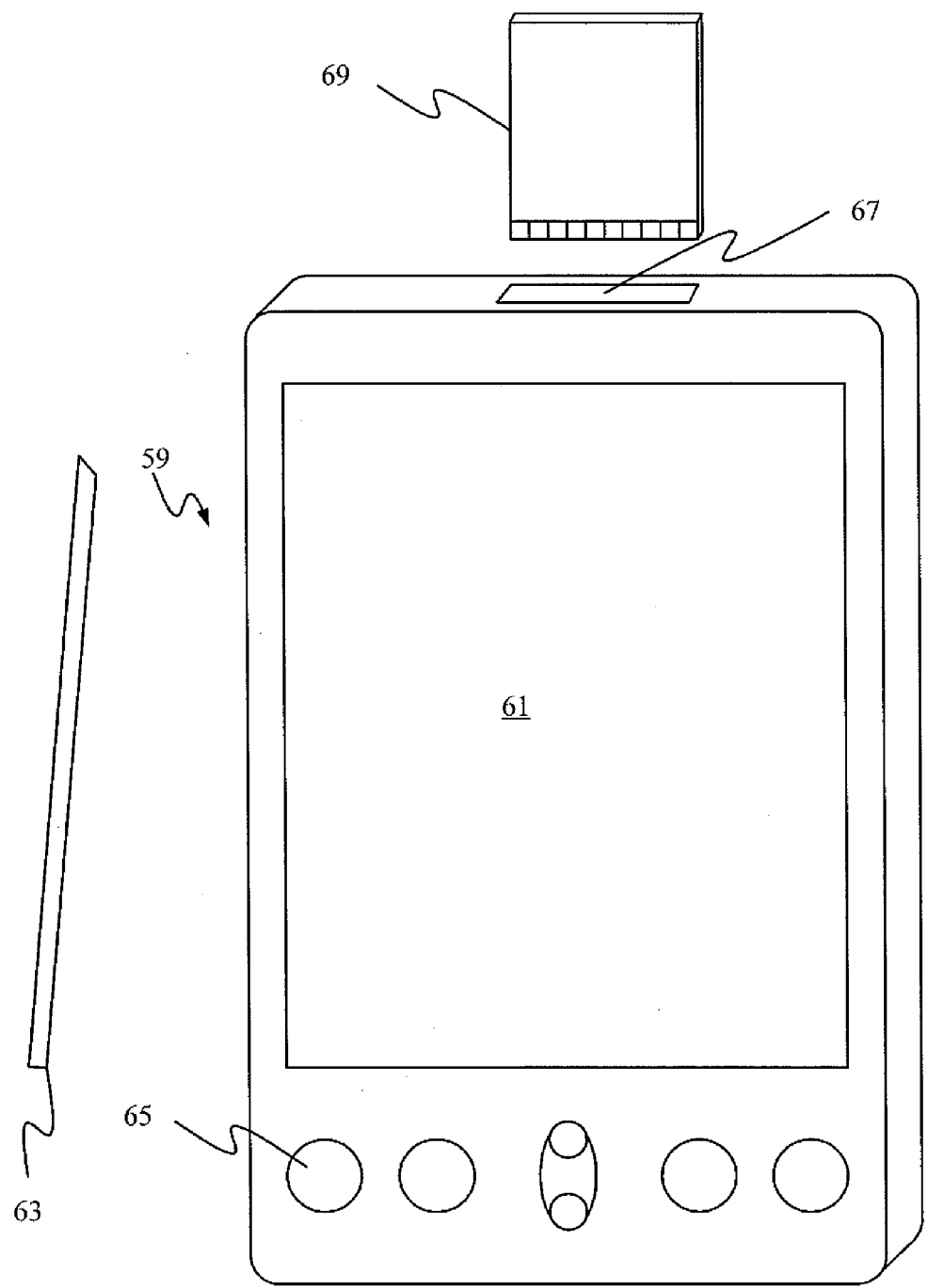

FIGS. 11, 11A and 12 provide additional examples of devices 16 that can be used, although others can be used as well. In FIG. 11, a mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

FIG. 11A is similar to FIG. 11 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

The mobile device of FIG. 12 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 13:
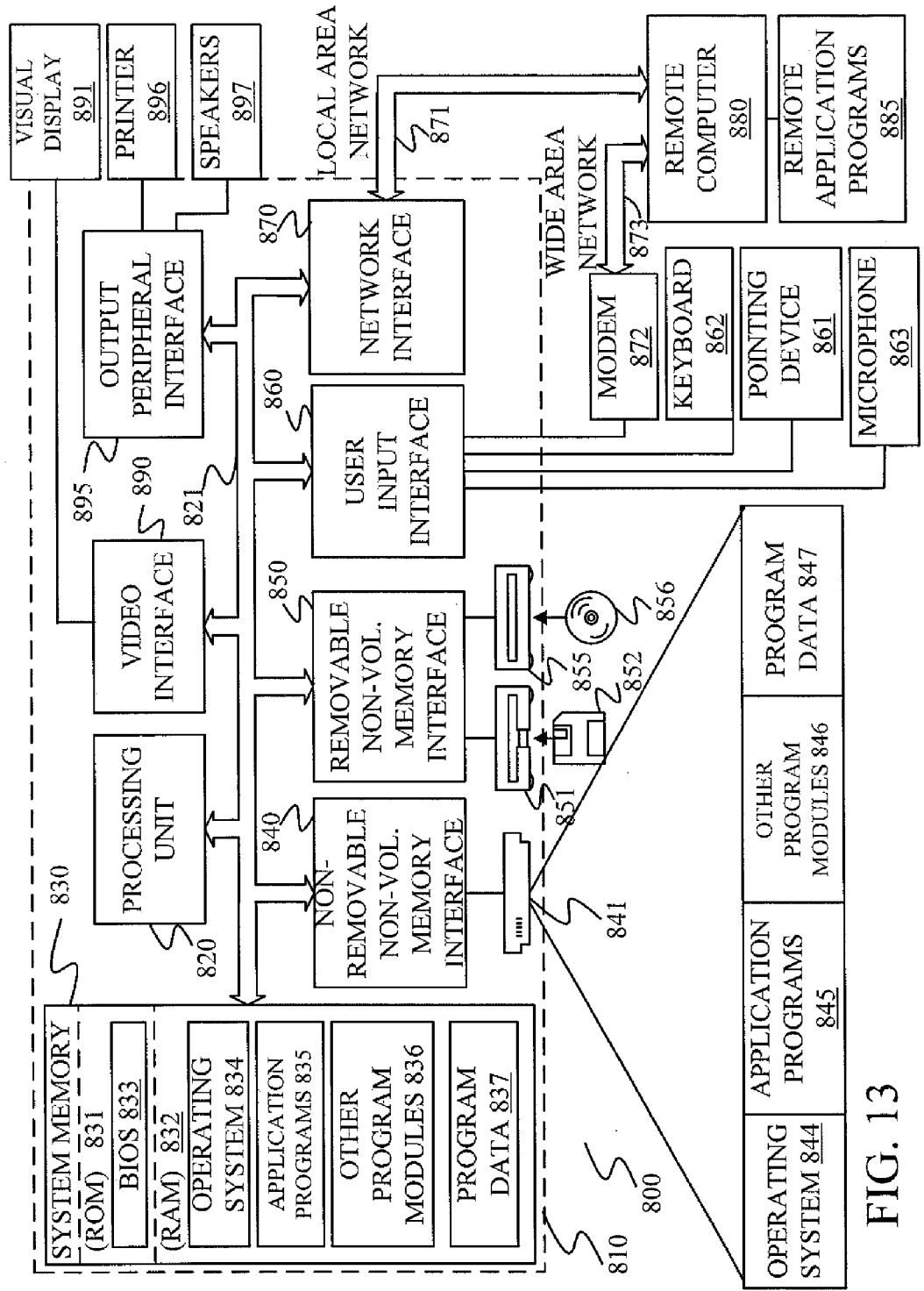
FIG. 13 is a block diagram of one illustrative computing environment.

FIG. 13 is one embodiment of a computing environment in which system 100 (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processors 116, 118, 130, 158, 160), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It will also be noted that the various embodiments described herein can be combined in different ways. That is, features from one or more embodiments can be combined with features from one or more other embodiments. This type of combination is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication system accessible by a plurality of different users, the communication system comprising:
    a processor; and
    memory storing instructions executable by the processor, wherein the instructions configure the communication system to:
        generate a real-time digital conferencing session that includes the plurality of different users as participants in the real-time digital conferencing session, wherein the real-time digital conferencing session is generated by communicatively coupling digital communication devices corresponding to the plurality of different users that are remotely located from one another and communicate over a digital communication network, the real-time digital conferencing session comprising real-time digital communications sent between the digital communication devices based on detected user inputs; and during the generated real-time digital conferencing session,
            receive an indication of a user action performed by at least one of the users in the real-time digital conferencing session;
            based on the indication of the user action, identify an implicit search criterion for a service to be provided during the real-time digital conferencing session;
            identify an availability criterion indicative of a required service provider availability in providing the service during the real-time digital conferencing session; and
        obtain a search result based on the implicit search criterion and the availability criterion, the search result identifying one or more available service providers that are each available to provide the service with the required service provider availability;
        select a service provider from the identified one or more available service providers; and
        communicatively couple the selected service provider to the real-time digital conferencing session such that the selected service provider is added as a participant to the real-time digital conferencing session to provide the service during the real-time digital conferencing session among the plurality of different users.

2. The communication system of claim 1, wherein the instructions configure the communication system to:
    generate a reputation display with a reputation input mechanism actuatable to receive a reputation user input indicative of reputation information for the service provider.

3. The communication system of claim 1, wherein the instructions configure the communication system to:
    generate a reputation display with a reputation input mechanism actuatable to receive a reputation provider input indicative of reputation information from the service provider for one or more of the plurality of users.

4. The communication system of claim 1, wherein the instructions configure the communication system to:
    generate a provider registration display that receives provider listing information indicative of services provided by the service provider.

5. The communication system of claim 4, wherein the instructions configure the communication system to:
    store the provider listing information in a provider data store.

6. The communication system of claim 5, wherein the instructions configure the communication system to:
    generate a user interface display with a user input mechanism actuatable to receive a search user input indicative of the service to be provided, and search the provider data store based on the search user input.

7. The communication system of claim 1 wherein the instructions configure the communication system to:
    generate a provider input display for the service provider to receive an acceptance input indicating that the selected service provider has accepted the selection.

8. The communication system of claim 1, wherein the instructions configure the communication system to:
    generate, within the real-time digital conferencing session among the plurality of different users, a service display with a service search user input mechanism; and
    receive, from one or more of the users through the service search user input mechanism, an input indicative of explicit search criteria for the service to be provided during the real-time digital conferencing session.

9. The communication system of claim 1, wherein the instructions configure the communication system to:
- identify a type of service to be provided by the service provider during the real-time digital conferencing session;
- based on the type of service, identify a level of access required by the service provider to perform the service; and
- communicatively couple the selected service provider to the real-time digital conferencing session such that the service provider is only provided with a level of access to the real-time digital conferencing session that is based on the service.

10. The communication system of claim 9, wherein the level of access comprises some, but not all, of the communication functionality available to the plurality of users during the real-time digital conferencing session.

11. The communication system of claim 1, wherein the user action comprises initiating a communication with a particular user.

12. The communication system of claim 11, wherein the implicit search criterion is based on a location associated with the particular user.

13. The communication system of claim 1, wherein the real-time digital communications comprise video communications.

14. The communication system of claim 1, wherein the real-time digital communications comprise text communications.

15. The communication system of claim 1, wherein the real-time digital conferencing session comprises a video conferencing session.

16. The communication system of claim 1, wherein the real-time digital conferencing session comprises a teleconferencing session over the digital communication network.

17. The communication system of claim 16, wherein the teleconferencing session comprises audio conferencing.

18. The communication system of claim 16, wherein the teleconferencing session comprises video conferencing.

19. The communication system of claim 16, wherein the teleconferencing session comprises web conferencing.

* * * * *